United States Patent
Yu et al.

(10) Patent No.: US 11,337,180 B2
(45) Date of Patent: May 17, 2022

(54) CHANNEL TRANSMISSION METHOD, BASE STATION, AND TERMINAL DEVICE

(71) Applicant: HUAWEI TECHNOLOGIES CO., LTD., Guangdong (CN)

(72) Inventors: Zheng Yu, Beijing (CN); Weiliang Zhang, Shanghai (CN); Xingqing Cheng, Beijing (CN); Yiling Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 16/725,536

(22) Filed: Dec. 23, 2019

(65) Prior Publication Data

US 2020/0137725 A1    Apr. 30, 2020

Related U.S. Application Data

(63) Continuation of application No. 15/937,399, filed on Mar. 27, 2018, now Pat. No. 10,560,922, which is a continuation of application No. PCT/CN2015/091197, filed on Sep. 30, 2015.

(51) Int. Cl.
*H04W 72/04* (2009.01)
*H04W 48/00* (2009.01)
(Continued)

(52) U.S. Cl.
CPC ........... *H04W 72/04* (2013.01); *H04W 48/00* (2013.01); *H04W 48/16* (2013.01);
(Continued)

(58) Field of Classification Search
CPC ..... H04W 72/04; H04W 48/00; H04W 48/16; H04W 52/0209
See application file for complete search history.

(56) References Cited

U.S. PATENT DOCUMENTS

| 7,734,292 B2 | 6/2010 | Cho et al. |
| 8,682,386 B2 | 3/2014 | Sasaki et al. |

(Continued)

FOREIGN PATENT DOCUMENTS

| CN | 1695400 | 11/2005 |
| CN | 102340843 | 2/2012 |

(Continued)

OTHER PUBLICATIONS

3GPP TS 36.300 V13.1.0 (Sep. 2015), 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2(Release 13), 254 pages.

(Continued)

*Primary Examiner* — Chandrahas B Patel
(74) *Attorney, Agent, or Firm* — Fish & Richardson P.C.

(57) ABSTRACT

The present disclosure relates to channel transmission methods, base stations, and terminal devices. One example method includes receiving a first channel from a network device, determining a frame structure used between the network device and a terminal device according to relationship between a transmission parameter set of the first channel and the frame structure, and communicating with the network device according to the frame structure.

14 Claims, 8 Drawing Sheets

(51) Int. Cl.
  *H04W 48/16* (2009.01)
  *H04W 52/02* (2009.01)
  *H04J 11/00* (2006.01)

(52) U.S. Cl.
  CPC ...... *H04W 52/0209* (2013.01); *H04J 11/0069* (2013.01); *Y02D 30/70* (2020.08)

(56) References Cited

U.S. PATENT DOCUMENTS

| | | | |
|---|---|---|---|
| 9,398,438 B2* | 7/2016 | Sartori | H04W 8/005 |
| 10,305,647 B2* | 5/2019 | Seok | H04L 27/2601 |
| 10,305,660 B2* | 5/2019 | Seol | H04W 72/044 |
| 2014/0241307 A1 | 8/2014 | Liu et al. | |
| 2016/0381681 A1* | 12/2016 | Nogami | H04W 72/0446 370/280 |
| 2018/0220395 A1 | 8/2018 | Yu et al. | |

FOREIGN PATENT DOCUMENTS

| | | |
|---|---|---|
| CN | 103391176 A | 11/2013 |
| CN | 104012024 | 8/2014 |
| EP | 1613112 | 6/2015 |
| JP | 2009246476 | 10/2009 |

OTHER PUBLICATIONS

3GPP TS 36.331 V12.7.0 (Sep. 2015), 3rd Generation Partnership Project, Technical Specification Group Radio Access Network, Evolved Universal Terrestrial Radio Access (E-UTRA), Radio Resource Control (RRC), Protocol specification (Release 12), 453 pages.

Ericsson et al., "NB LTE—Concept Description L1" 3GPP TSG-RAN #69 RP-151397, Sep. 14-16, 2015, 24 pages.

Office Action issued in Chinese Application No. 201580037482.0 dated Aug. 28, 2019, 8 pages.

Panasonic, "Commonality design between eMTC and NB-IOT", 3GPP TSG RAN WG1 Meeting #82bis R1-155776, Oct. 5-9, 2015, 5 pages.

PCT International Search Report issued in International Application No. PCT/CN2015/091197, dated Jun. 21, 2016, 12 pages.

Samsung et al.,"NB-LTE—Inband Operation" 3GPP TSG RAN Meeting #69 RP-151557, Sep. 14-16, 2015,13 pages.

3GPP TS 36.300 V13.1.0 (Sep. 2015), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Sep. 2015, 254 pages.

Office Action issued in Chinese Application No. 201580037482.0 dated Mar. 3, 2020, 18 pages (with English translation).

* cited by examiner

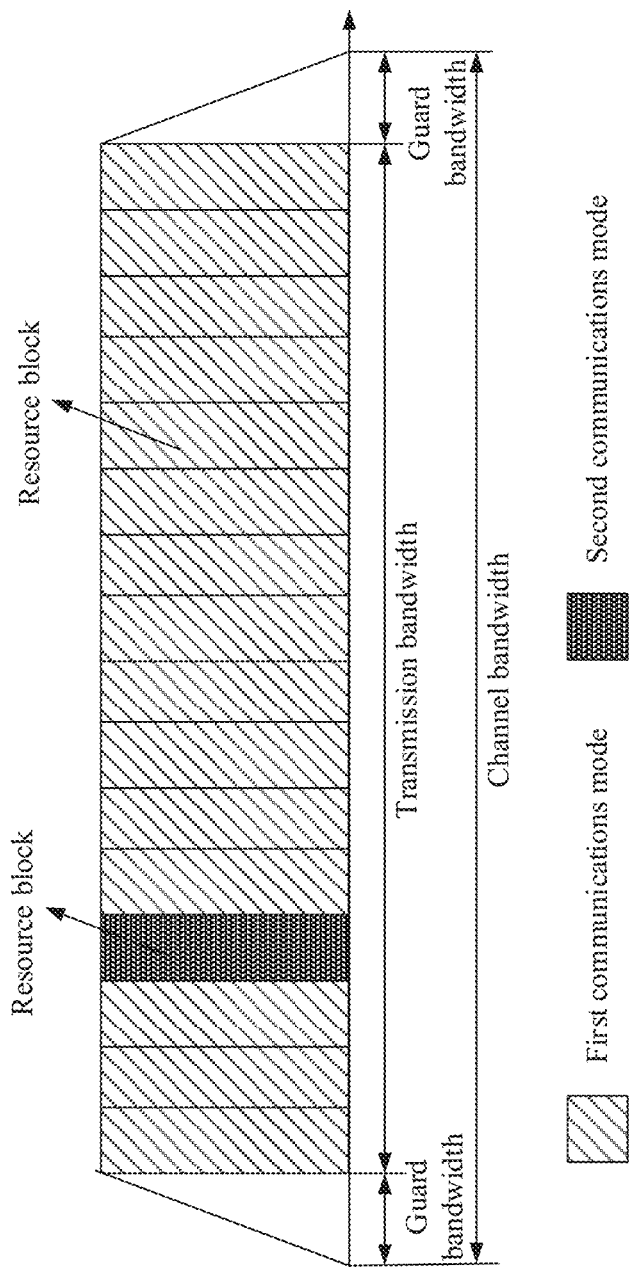
FIG. 3-a

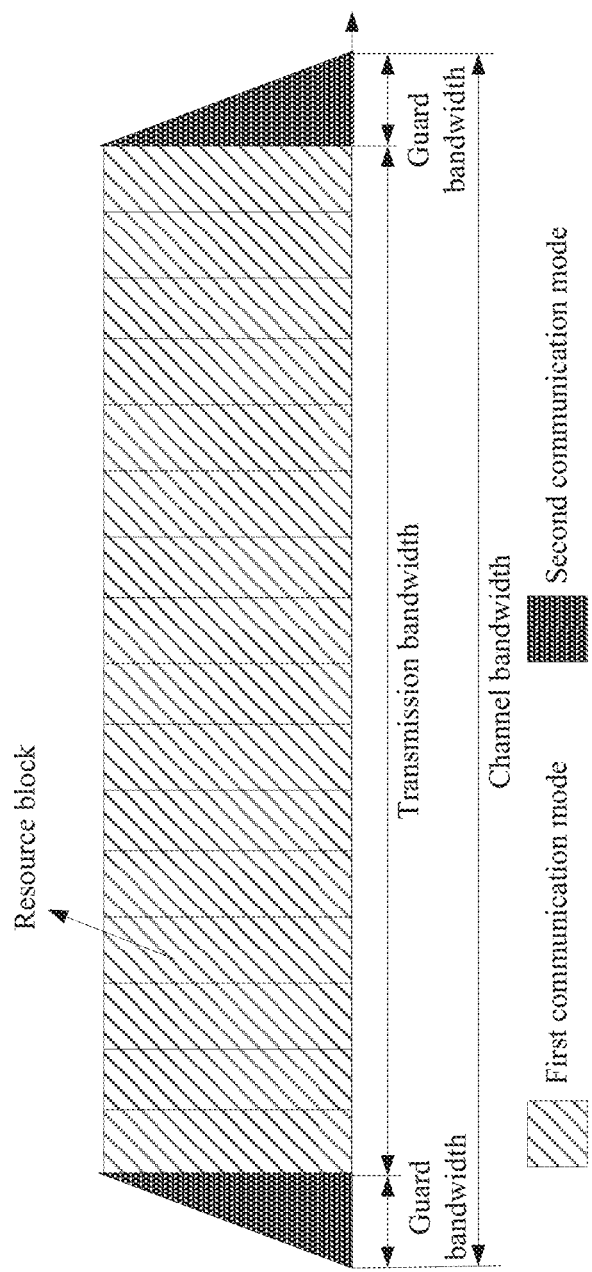
FIG. 3-b

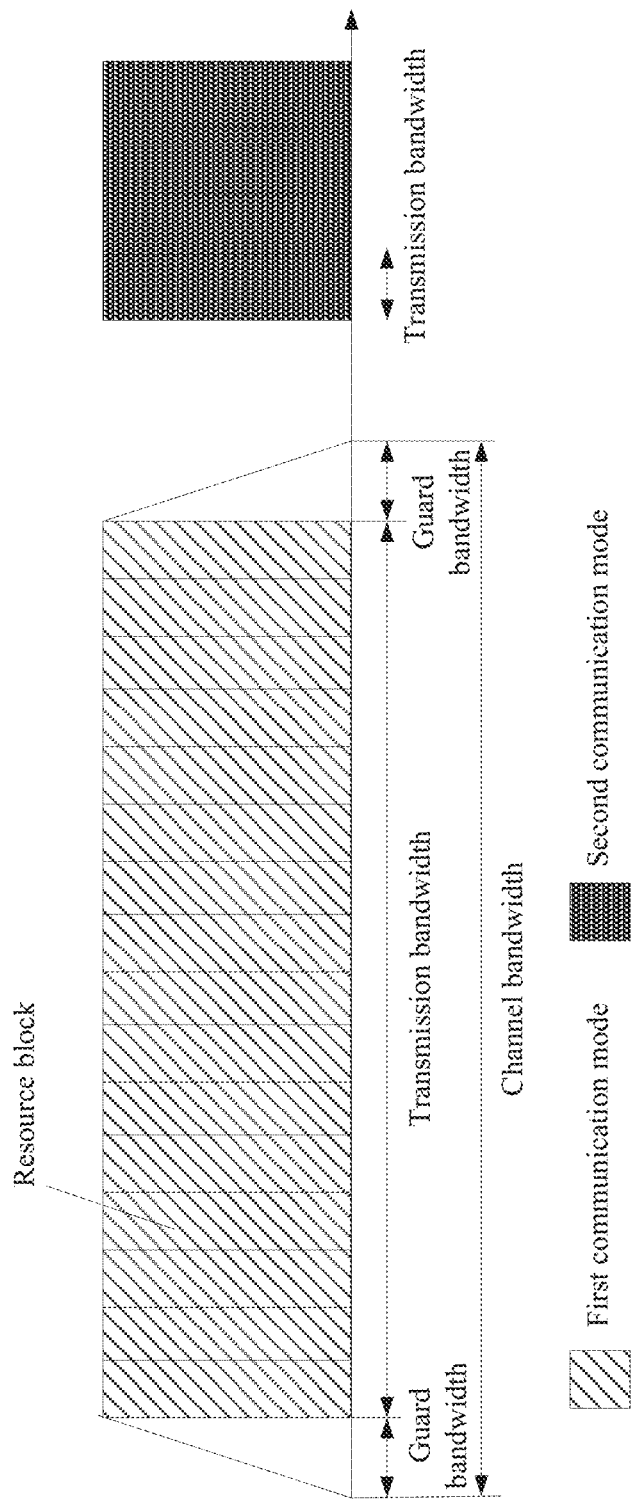
FIG. 3-c

CHANNEL TRANSMISSION METHOD, BASE STATION, AND TERMINAL DEVICE

CROSS-REFERENCE TO RELATED APPLICATIONS

This application is a continuation of U.S. patent application Ser. No. 15/937,399, filed on Mar. 27, 2018, which is a continuation of International Application No. PCT/CN2015/091197, filed on Sep. 30, 2015, the disclosures of which are hereby incorporated by reference in their entireties.

TECHNICAL FIELD

Embodiments of the present invention relate to the communications field, and in particular, to a channel transmission method, a base station, and terminal device.

BACKGROUND

The Internet of Things (IOT) is a network on which information about a physical world is obtained by deploying various devices having specific perception, computing, execution, and communication capabilities, and that is used to implement an interconnection between a person and an object and between objects by means of information transmission, coordination, and processing. In short, the Internet of Things is used to implement interworking between a person and an object and between objects. Possible applications of the Internet of Things include various aspects such as a smart grid, intelligent agriculture, intelligent transportation, and environment detection.

As a mobile communication standardization organization, the 3rd Generation Partnership Project (3GPP) is conducting technical research and standard optimization for Internet of Things services. A main research and optimization direction is to implement cost reduction and coverage enhancement. In terms of cost reduction, an operating bandwidth of a terminal device can be reduced. For example, limiting an operating bandwidth of a terminal device to 1.4 MHz (or 200 kHz, or 180 kHz) is an important research direction. In terms of coverage enhancement, coverage enhancement support is provided mainly for a machine type communication (MTC) device having a relatively large path loss in places such as a basement, so that the device in a special scenario can access a network to obtain a service. Coverage enhancement means providing coverage enhancement support for terminal device having a relatively large path loss in places such as a basement and a cell edge, so that the terminal device in the foregoing scenarios can access a network to obtain a service. Coverage enhancement may be implemented in one or more of repeated transmission, spread spectrum transmission, retransmission, transmission time interval bundling-based transmission, narrowband (for example, subcarrier scheduling) transmission, ultra-narrowband (whose bandwidth is, for example, dozens of hertz to more than 10 kilohertz) transmission, power spectrum density boosting-based transmission, requirement relaxed transmission, or continuously attempted transmission. Signal repetition is one of methods for implementing coverage enhancement. When coverage enhancement is implemented, coverage can be expanded to some extent, but more system resources may be consumed. Therefore, it is necessary to improve resource utilization when signal repetition is used to implement coverage enhancement.

Communication between a base station and terminal device may be implemented in one of a plurality of communication modes. For example, a plurality of communication modes are supported in a transmission bandwidth of a legacy carrier. A communication mode may be understood as an air interface communications technology, a communications specification, a communication deployment scenario, or a communications standard. Different communication modes may be understood as different air interface communications technologies, different communications standard technologies, or the like. For example, terminal device in a Long Term Evolution (LTE) system or a Long Term Evolution Advanced (LTE-A) system supports an LTE (or LTE-A) communications technology. A base station can further communicate with another terminal device (for example, MTC terminal device or IoT terminal device) on an LTE carrier by using another air interface technology different from an LTE communication mode.

Therefore, when a base station and terminal device communicate with each other, communication between the base station and the terminal device may be implemented in one of a plurality of communication modes (for example, one of two, three, or more types of communication modes). However, an existing indication method is applicable only to indication of a frame structure, information content, and the like, and there is no method for indicating a communication mode in the prior art.

SUMMARY

Embodiments of the present invention provide a channel transmission method, a base station, and terminal device, to implement indication of a communication mode, so that a base station and terminal device communicate with each other in a communication mode indicated by the base station. This improves flexibility of system design, reduces complexity of blindly detecting a communication mode by the terminal device, and reduces power consumption of the terminal device.

According to a first aspect, an embodiment of the present invention provides a channel transmission method, including: determining, by a base station, a communication mode to be used between the base station and terminal device; determining, by the base station, a transmission parameter of a first channel according to the determined communication mode, where the communication mode and the transmission parameter of the first channel are in a one-to-one correspondence; and transmitting, by the base station, the first channel to the terminal device.

With reference to the first aspect, in a first possible implementation of the first aspect, the determining, by the base station, a transmission parameter of a first channel according to the determined communication mode includes:
determining, by the base station, the transmission parameter of the first channel and a transmission parameter of a second channel according to the determined communication mode, where the communication mode and a transmission parameter set are in a one-to-one correspondence, and the transmission parameter set includes the transmission parameter of the first channel and the transmission parameter of the second channel; and
the transmitting, by the base station, the first channel to the terminal device includes:
sending, by the base station, both the first channel and the second channel to the terminal device.

With reference to the first aspect or the first possible implementation of the first aspect, in a second possible implementation of the first aspect, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

With reference to the first aspect, or the first or the second possible implementation of the first aspect, in a third possible implementation of the first aspect, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information.

With reference to the first aspect, in a fourth possible implementation of the first aspect, the determining, by the base station, a transmission parameter of a first channel according to the determined communication mode includes:

determining, by the base station, a transmission parameter of a synchronization channel according to the determined communication mode, where different communication modes are corresponding to different transmission parameters of the synchronization channel; or determining, by the base station, a transmission parameter of a reference signal according to the determined communication mode, where different communication modes are corresponding to a same transmission parameter of a synchronization channel; or determining, by the base station, a transmission parameter of a broadcast channel according to the determined communication mode, where different communication modes are corresponding to a same transmission parameter of a synchronization channel and/or a same transmission parameter of a reference signal; or determining, by the base station according to the determined communication mode, a transmission parameter of a physical channel transmitted after a broadcast channel is transmitted, where different communication modes are corresponding to at least one of a same transmission parameter of a synchronization channel, a same transmission parameter of a reference signal, or a same transmission parameter of the broadcast channel.

With reference to the first possible implementation of the first aspect, in a fifth possible implementation of the first aspect, the determining, by the base station, the transmission parameter of the first channel and a transmission parameter of a second channel according to the determined communication mode includes:

determining, by the base station, a transmission parameter interrelationship according to the determined communication mode, where the transmission parameter interrelationship is an interrelationship between the transmission parameter of the first channel and the transmission parameter of the second channel.

With reference to the fifth possible implementation of the first aspect, in a sixth possible implementation of the first aspect, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

With reference to the first aspect, or the first, the second, the third, the fourth, the fifth, or the sixth possible implementation of the first aspect, in a seventh possible implementation of the first aspect, the communication mode includes at least one of the following modes: an in-band mode, a guardband mode, or an standalone mode.

According to a second aspect, an embodiment of the present invention further provides another channel transmission method, including:

determining, by terminal device, a first channel transmitted by a base station;

obtaining, by the terminal device, a transmission parameter of the first channel from the first channel; and determining, by the terminal device according to the transmission parameter of the first channel, a communication mode used between the base station and the terminal device, where the communication mode and the transmission parameter of the first channel are in a one-to-one correspondence.

With reference to the second aspect, in a first possible implementation of the second aspect, the method further includes:

determining, by the terminal device, a second channel transmitted by the base station; and obtaining, by the terminal device, a transmission parameter of the second channel from the second channel; and the determining, by the terminal device according to the transmission parameter of the first channel, a communication mode used between the base station and the terminal device includes:

determining, by the terminal device, the communication mode according to the transmission parameter of the first channel and the transmission parameter of the second channel, where the communication mode and a transmission parameter set are in a one-to-one correspondence, and the transmission parameter set includes the transmission parameter of the first channel and the transmission parameter of the second channel.

With reference to the second aspect or the first possible implementation of the second aspect, in a second possible implementation of the second aspect, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

With reference to the second aspect, or the first or the second possible implementation of the second aspect, in a third possible implementation of the second aspect, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information.

With reference to the second aspect, in a fourth possible implementation of the second aspect, the method further includes:

when the first channel is a synchronization channel, determining, by the terminal device, that different communication modes are corresponding to different transmission parameters of the synchronization channel; or when the first channel is a reference signal, determining, by the terminal device, that different communication modes are corresponding to a same transmission parameter of a synchronization channel; or when the first channel is a broadcast channel, determining, by the terminal device, that different communication modes are corresponding to a same transmission parameter of a synchronization channel and/or a same transmission parameter of the reference signal; or when the first channel is a physical channel transmitted after a broadcast channel is transmitted, determining, by the terminal device, that different communication modes are corresponding to at least one of a same transmission parameter of a synchronization channel, a same transmission parameter of a reference signal, or a same transmission parameter of the broadcast channel.

With reference to the first possible implementation of the second aspect, in a fifth possible implementation of the second aspect, the determining, by the terminal device, the communication mode according to the transmission parameter of the first channel and the transmission parameter of the second channel includes:

determining, by the terminal device, the communication mode according to a transmission parameter interrelationship, where the transmission parameter interrelationship is an interrelationship between the transmission parameter of the first channel and the transmission parameter of the second channel.

With reference to the fifth possible implementation of the second aspect, in a sixth possible implementation of the second aspect, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

With reference to the second aspect, or the first, the second, the third, the fourth, the fifth, or the sixth possible implementation of the second aspect, in a seventh possible implementation of the second aspect, the communication mode includes at least one of the following modes: an in-band mode, a guardband mode, or an standalone mode.

According to a third aspect, an embodiment of the present invention further provides a base station, including:

a mode determining module, configured to determine a communication mode to be used between the base station and terminal device:

a parameter determining module, configured to determine a transmission parameter of a first channel according to the determined communication mode, where the communication mode and the transmission parameter of the first channel are in a one-to-one correspondence; and a transmission module, configured to transmit the first channel to the terminal device.

With reference to the third aspect, in a first possible implementation of the third aspect, the parameter determining module is specifically configured to determine the transmission parameter of the first channel and a transmission parameter of a second channel according to the determined communication mode, where the communication mode and a transmission parameter set are in a one-to-one correspondence, and the transmission parameter set includes the transmission parameter of the first channel and the transmission parameter of the second channel; and the transmission module is specifically configured to send both the first channel and the second channel to the terminal device.

With reference to the third aspect or the first possible implementation of the third aspect, in a second possible implementation of the third aspect, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

With reference to the third aspect, or the first or the second possible implementation of the third aspect, in a third possible implementation of the third aspect, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information.

With reference to the third aspect, in a fourth possible implementation of the third aspect, the parameter determining module is specifically configured to: determine a transmission parameter of a synchronization channel according to the determined communication mode, where different communication modes are corresponding to different transmission parameters of the synchronization channel; or determine a transmission parameter of a reference signal according to the determined communication mode, where different communication modes are corresponding to a same transmission parameter of a synchronization channel; or determine a transmission parameter of a broadcast channel according to the determined communication mode, where different communication modes are corresponding to a same transmission parameter of a synchronization channel and/or a same transmission parameter of a reference signal; or determine, according to the determined communication mode, a transmission parameter of a physical channel transmitted after a broadcast channel is transmitted, where different communication modes are corresponding to at least one of a same transmission parameter of a synchronization channel, a same transmission parameter of a reference signal, or a same transmission parameter of the broadcast channel.

With reference to the first possible implementation of the third aspect, in a fifth possible implementation of the third aspect, the parameter determining module is specifically configured to determine a transmission parameter interrelationship according to the determined communication mode, where the transmission parameter interrelationship is an interrelationship between the transmission parameter of the first channel and the transmission parameter of the second channel.

With reference to the fifth possible implementation of the third aspect, in a sixth possible implementation of the third aspect, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

With reference to the third aspect, or the first, the second, the third, the fourth, the fifth, or the sixth possible implementation of the third aspect, in a seventh possible implementation of the third aspect, the communication mode includes at least one of the following modes: an in-band mode, a guardband mode, or an standalone mode.

According to a fourth aspect, an embodiment of the present invention further provides terminal device, including:

a channel determining module, configured to determine a first channel transmitted by a base station;

a parameter obtaining module, configured to obtain a transmission parameter of the first channel from the first channel; and a mode determining module, configured to determine, according to the transmission parameter of the first channel, a communication mode used between the base station and the terminal device, where the communication mode and the transmission parameter of the first channel are in a one-to-one correspondence.

With reference to the fourth aspect, in a first possible implementation of the fourth aspect, the channel determining module is further configured to determine a second channel transmitted by the base station;

the parameter determining module is further configured to obtain a transmission parameter of the second channel from the second channel; and the mode determining module is specifically configured to determine the communication mode according to the transmission parameter of the first channel and the transmission parameter of the second channel, where the communication mode and a transmission parameter set are in a one-to-one correspondence, and the transmission parameter set includes the transmission parameter of the first channel and the transmission parameter of the second channel.

With reference to the fourth aspect or the first possible implementation of the fourth aspect, in a second possible implementation of the fourth aspect, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

With reference to the fourth aspect, or the first or the second possible implementation of the fourth aspect, in a third possible implementation of the fourth aspect, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information.

With reference to the fourth aspect, in a fourth possible implementation of the fourth aspect, the parameter determining module is further configured to: when the first channel is a synchronization channel, determine that different communication modes are corresponding to different transmission parameters of the synchronization channel; or when the first channel is a reference signal, determine that different communication modes are corresponding to a same transmission parameter of a synchronization channel; or when the first channel is a broadcast channel, determine that different communication modes are corresponding to a same transmission parameter of a synchronization channel and/or a same transmission parameter of the reference signal; or when the first channel is a physical channel transmitted after a broadcast channel is transmitted, determine that different communication modes are corresponding to at least one of a same transmission parameter of a synchronization channel, a same transmission parameter of a reference signal, or a same transmission parameter of the broadcast channel.

With reference to the first possible implementation of the fourth aspect, in a fifth possible implementation of the fourth aspect, the mode determining module is specifically configured to determine the communication mode according to a transmission parameter interrelationship, where the transmission parameter interrelationship is an interrelationship between the transmission parameter of the first channel and the transmission parameter of the second channel.

With reference to the fifth possible implementation of the fourth aspect, in a sixth possible implementation of the fourth aspect, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

With reference to the fourth aspect, or the first, the second, the third, the fourth, the fifth, or the sixth possible implementation of the fourth aspect, in a seventh possible implementation of the fourth aspect, the communication mode includes at least one of the following modes: an in-band mode, a guardband mode, or an standalone mode.

It can be learned from the foregoing technical solutions that the embodiments of the present invention have the following advantages:

In some embodiments of the present disclosure: the base station first determines the communication mode to be used between the base station and the terminal device; after the base station determines the communication mode that should be used, the base station determines the transmission parameter of the first channel according to the determined communication mode; finally, the base station transmits the first channel to the terminal device. Because the base station can determine the transmission parameter of the first channel according to the one-to-one correspondence between the communication mode and the transmission parameter of the first channel, the first channel transmitted by the base station to the terminal device can indicate the communication mode used by the base station, so as to implement indication of the communication mode. In addition, after the terminal device determines the first channel sent by the base station to the terminal device, the terminal device can determine the transmission parameter of the first channel from the received first channel, and the terminal device can determine, according to the one-to-one correspondence between the communication mode and the transmission parameter of the first channel, the communication mode used by the base station. In this way, the communication mode used between the base station and the terminal device can be uniquely determined. According to the channel transmission method provided in the embodiments of the present invention, determining a communication mode by terminal device and indicating the communication mode by a base station can be implemented. Therefore, the base station and the terminal device communicate with each other in the communication mode indicated by the base station. This improves flexibility of system design, reduces complexity of blindly detecting a communication mode by the terminal device, and reduces power consumption of the terminal device.

BRIEF DESCRIPTION OF DRAWINGS

FIG. 3-a is a schematic diagram of transmission performed between a base station and terminal device in an in-band mode or a sharing mode according to an embodiment of the present invention;

FIG. 3-b is a schematic diagram of transmission performed between a base station and terminal device in a guardband mode according to an embodiment of the present invention;

FIG. 3-c is a schematic diagram of transmission performed between a base station and terminal device in an standalone mode according to an embodiment of the present invention;

DESCRIPTION OF EMBODIMENTS

Figure 1:
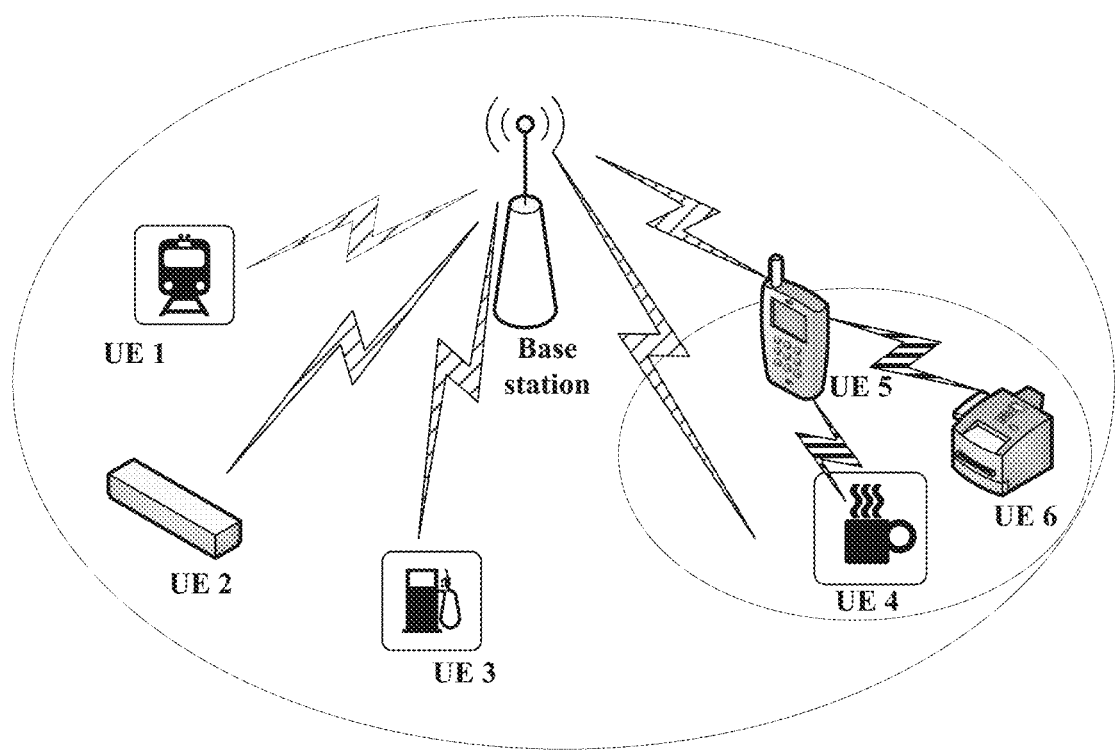
FIG. 1 is a system architecture diagram of a communications system to which a channel transmission method in the present invention is applied.

The embodiments of the present invention provide a channel transmission method, a base station, and terminal device, to implement indication of a communication mode, so that a base station and terminal device communicate with each other in a communication mode indicated by the base station. This improves flexibility of system design, reduces complexity of blindly detecting a communication mode by the terminal device, and reduces power consumption of the terminal device.

In the specification, claims, and accompanying drawings of the present invention, the terms "first", "second", and so on are intended to distinguish between similar objects but do not necessarily indicate a particular order or sequence. It should be understood that the terms used in such a way are interchangeable in proper circumstances, and this is merely a discrimination manner used when objects having a same attribute are described in the embodiments of the present invention. In addition, the terms "including", "comprising", and any other variants mean to cover a non-exclusive inclusion, so that a process, method, system, product, or device that includes a series of units is not necessarily limited to those units, but may include other units not expressly listed or inherent to such a process, method, product, or device.

A system architecture to which a channel transmission method in the present invention is applied is first described. The present invention is mainly applied to an LTE system or a Long Term Evolution Advanced (LTE-A) system. The present invention may also be applied to another communications system, such as a Wideband Code Division Multiple Access (WCDMA) system or a Time Division-Synchronous Code Division Multiple Access (TD-SCDMA) system, provided that an entity that can send information exists in the communications system and another entity that can receive information exists in the communications system.

Transmission in the embodiments of the present invention may be sending or receiving. If transmission by a device on one side is sending, transmission by a communications device on the other side corresponding to the device on the side is receiving, and vice versa. Coverage enhancement in the embodiments of the present invention may be implemented in one or more of repeated transmission, spread spectrum transmission, retransmission, transmission time interval bundling-based transmission, narrowband (for example, subcarrier scheduling) transmission, ultra-narrowband (whose bandwidth is, for example, dozens of hertz to more than 10 kilohertz) transmission, power spectrum density boosting-based transmission, requirement relaxed transmission, or continuously attempted transmission. A low-cost terminal or a low-complexity terminal means that an operating bandwidth of a terminal device is less than an operating bandwidth of a non-low-cost terminal or a non-low-complexity terminal. The operating bandwidth may be one or more of a processing bandwidth, a radio frequency processing bandwidth, or a baseband processing bandwidth. For example, the operating bandwidth is 1.4 MHz (or 200 kHz, or 180 kHz). The operating bandwidth is a frequency resource having a specific frequency width. The operating bandwidth may include one or more subcarriers (for example, a size of a subcarrier is 15 kHz, or 2.5 kHz. or 3.75 kHz), or may include one or more resource blocks.

Referring to FIG. 1, FIG. 1 is a system architecture diagram of a communications system to which a channel transmission method in the present invention is applied. As shown in FIG. 1, a base station (English: Base station) and terminal device (for example UE, User Equipment) 1 to UE 6 form a communications system. In the communications system, the base station sends one or more of system information, an RAR message, or a paging message to one or more of the UE 1 to the UE 6. The base station is a transmit end device in the channel transmission method in the present invention. The UE 1 to the UE 6 are receive end devices in the channel transmission method in the present invention. In addition, the UE 4 to the UE 6 also form a communications system. In the communications system, the UE 5 may function as a base station. The UE 5 may send one or more of system information, an RAR message, or a paging message to one or more of the UE 4 or the UE 6.

The following separately provides descriptions in detail.

Figure 2:
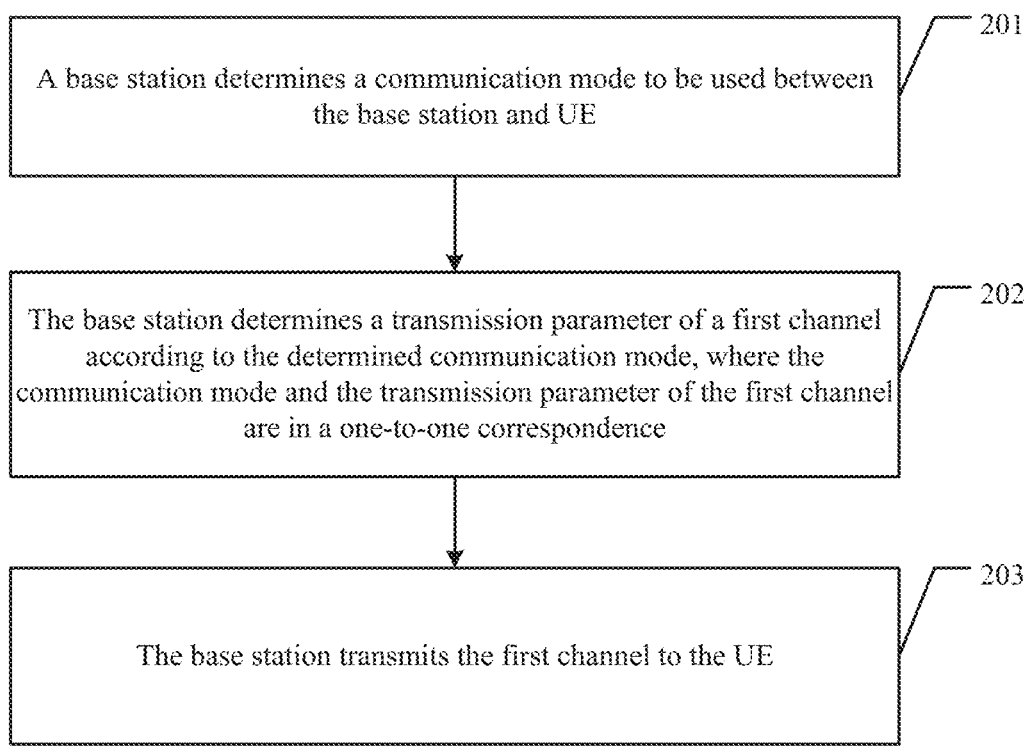
FIG. 2 is a schematic block flowchart of a channel transmission method according to an embodiment of the present invention.

An embodiment of a channel transmission method in the present invention may be applied to a scenario in which a base station sends a channel to terminal device. Referring to FIG. 2, the channel transmission method may include the following steps.

201. A base station determines a communication mode to be used between the base station and terminal device.

In this embodiment of the present invention, the base station and the terminal device may communicate with each other in a plurality of different communication modes. For example, a plurality of communication modes are supported in a transmission bandwidth of a legacy (English: legacy) carrier. A communication mode may be understood as an air interface communications technology, a communications specification, a communication deployment scenario, or a communications standard. Different communication modes are different air interface communications technologies, different communications standard technologies, or the like. Different communication modes may be corresponding to different channel structures, signal structures, frame structures, channel transmission methods, information content, or the like. Therefore, after the base station determines a communication mode that should be used, both the base station and the terminal device need to configure, according to the communication mode determined to be used, one or more of a channel structure, a signal structure, a frame structure, an channel transmission method, or information content.

In an example, a plurality of communication modes may be configured between the base station and the terminal device. For example, there are a total of three communication modes between the base station and the terminal device, and the three communication modes are a communication mode a, a communication mode b, and a communication mode c. The base station first determines a communication mode that should be used between the base station and the terminal device. For example, the base station determines to use the communication mode b.

It should be noted that, in this embodiment of the present invention, the base station determines one communication mode to be used between the base station and the terminal device, or the base station determines two communication modes to be used between the base station and the terminal device. For example, that a base station determines a communication mode to be used between the base station and terminal device in step 201 includes the following step: The base station determines a first communication mode to be used by the base station and the terminal device in a first period and a second communication mode to be used in a second period, that is, the communication mode determined by the base station is a plurality of communication modes to be used between the base station and the terminal device in different periods. Therefore, the communication mode determined by the base station in this embodiment of the present invention may be a plurality of communication modes that can be determined in one determining process. For the communication mode determined by the base station in step 101 in this embodiment of the present invention, a communication mode type and a quantity of determined communication modes may be specifically determined according to an application scenario. This is not limited.

In some embodiments of the present invention, the communication mode includes at least one of the following modes: an in-band mode, a guardband mode, or an stand-alone mode. In a transmission bandwidth of a legacy carrier, not only a legacy mode (for example, for an LTE system, a legacy mode is an LTE air interface standard) but also another communication mode used for another terminal device are supported, and the another communication mode used for another terminal device is referred to as an in-band (English: in-band) mode for short, and the in-band mode may also be referred to as a sharing mode. As shown in FIG. 3-a, FIG. 3-a is a schematic diagram of transmission performed between a base station and terminal device in an in-band mode or a sharing mode according to an embodiment of the present invention. A first communication mode is a legacy mode, and a second communication mode is an in-band mode or a sharing mode. The in-band mode or the sharing mode is used on a resource block in a transmission bandwidth, and the legacy mode is used on remaining resource blocks. The base station determines, according to a transmission requirement of the base station, the first communication mode or the second communication mode that needs to be used. This is not specifically limited herein.

For another example, in another communication mode, another communication mode is supported in a guard bandwidth of a legacy carrier. For example, a first communication mode is used in a transmission bandwidth of the legacy carrier, and a second communication mode is used in the guard bandwidth of the legacy carrier (generally, in the first communication mode, this part of bandwidth is not used to transmit data, another signal, or the like). For convenience, a mode in which the second communication mode is used in the guard bandwidth of the legacy carrier for communication is referred to as a guardband mode for short. As shown in FIG. 3-b, FIG. 3-b is a schematic diagram of transmission performed between a base station and terminal device in a guardband mode according to an embodiment of the present invention. A first communication mode is a legacy mode, and a second communication mode is a guardband mode. The guardband mode is used on a resource block in a transmission bandwidth, and the legacy mode is used on remaining resource blocks. The base station determines, according to a transmission requirement of the base station, the first communication mode or the second communication mode that needs to be used. This is not specifically limited herein.

For another example, in another communication mode, a first communication mode is supported on a legacy carrier, and a second communication mode is supported on another frequency resource (that is, on a frequency resource of a non-legacy carrier). For convenience, a mode in which the second communication mode is used on the another frequency resource (that is, on the frequency resource of the non-legacy carrier) for communication is referred to as an standalone mode for short. As shown in FIG. 3-c, FIG. 3-c is a schematic diagram of transmission performed between a base station and terminal device in an standalone mode according to an embodiment of the present invention. A first communication mode is a legacy mode, and a second communication mode is an standalone mode. The base station determines, according to a transmission requirement of the base station, the first communication mode or the second communication mode that needs to be used. This is not specifically limited herein.

It should be noted that, in some other embodiments of the present invention, the communication mode may include a plurality of different types of modes and may be specifically set flexibly according to an application scenario. For example, an in-band mode or a sharing mode, and a guard-band mode in the communication mode may alternatively be classified as a first type of mode, and an standalone mode in the communication mode may be classified as a second type of mode. The first type of mode may be referred to as an in-band mode, and the second type of mode may be referred to as an outband (English: outband) mode. In addition, the first type of mode may be referred to as a continuous mode, and the second type of mode may be referred to as a discontinuous mode. It can be understood that, implementation of defining the plurality of types of modes included in the communication mode does not affect specific implementation of the communication mode, between the base station and the terminal device, determined by the base station in this embodiment of the present invention.

202. The base station determines a transmission parameter of a first channel according to the determined communication mode, where the communication mode and the transmission parameter of the first channel are in a one-to-one correspondence.

In this embodiment of the present invention, after the base station determines the communication mode to be used between the base station and the terminal device in step 201, the transmission parameter of the first channel may be determined on the base station side according to the one-to-one correspondence between the communication mode and the transmission parameter of the first channel. Different communication modes are corresponding to different transmission parameters of the first channel. The one-to-one correspondence between the communication mode and the transmission parameter of the first channel may be predefined by a system, or may be determined by the base station and notified by the base station to the terminal device. After the base station determines the communication mode to be used between the base station and the terminal device, the base station determines, according to the correspondence and the communication mode determined by the base station, the transmission parameter corresponding to the communication mode. After determining the transmission parameter of the first channel, the base station transmits the first channel according to the transmission parameter. In an example, a plurality of communication modes may be configured between the base station and the terminal device. For example, there are a total of three communication modes between the base station and the terminal device, and the three communication modes are a communication mode a, a communication mode b, and a communication mode c, and are corresponding to different transmission parameters of the first channel. It is assumed that the communication mode and the transmission parameter of the first channel that are configured on the base station side are in the following one-to-one correspondence: The communication mode a is uniquely corresponding to a transmission parameter x, the communication mode b is uniquely corresponding to a transmission parameter y, and the communication mode c is uniquely corresponding to a transmission parameter z. The base station first determines a communication mode that should be used between the base station and the terminal device. For example, the base station determines to use the communication mode b, and then, the base station determines, according to the one-to-one correspondence and the communication mode b, that the transmission parameter of the first channel is the transmission parameter y.

In some embodiments of the present invention, that the base station determines a transmission parameter of a first channel according to the determined communication mode in step 202 may specifically include one of the following steps:

A1. The base station determines a transmission parameter of a synchronization channel according to the determined communication mode, where different communication modes are corresponding to different transmission parameters of the synchronization channel.

A2. The base station determines a transmission parameter of a reference signal according to the determined communication mode, where different communication modes are corresponding to a same transmission parameter of a synchronization channel.

A3. The base station determines a transmission parameter of a broadcast channel according to the determined communication mode, where different communication modes are corresponding to a same transmission parameter of a synchronization channel and/or a same transmission parameter of a reference signal.

A4. The base station determines, according to the determined communication mode, a transmission parameter of a physical channel transmitted after a broadcast channel is transmitted, where different communication modes are corresponding to at least one of a same transmission parameter of a synchronization channel, a same transmission parameter of a reference signal, or a same transmission parameter of the broadcast channel.

For example, the base station transmits various channels to the terminal device in the following sequence: a synchronization channel, a reference signal, a broadcast channel, and a physical channel carrying system information. Therefore, in the implementation of step A1, the first channel is a synchronization channel, that is, the base station needs to indicate, by using a transmission parameter of the synchronization channel, a communication mode to be used between the base station and the terminal device. In this case, different communication modes are corresponding to different transmission parameters of the synchronization channel, and the communication mode and the transmission parameter of the synchronization channel are in a one-to-one correspondence.

In the implementation of step A2, the first channel is a reference signal, that is, the base station needs to indicate, by using a transmission parameter of the reference signal, a communication mode to be used between the base station and the terminal device. In this case, different communication modes are corresponding to different transmission parameters of the reference signal, and the communication mode and the transmission parameter of the reference signal are in a one-to-one correspondence. In this case, a same synchronization channel may be transmitted before the reference signal is transmitted, regardless of a communication mode used by the base station, so as to reduce complexity caused when different synchronization channels need to be transmitted because the base station and the terminal device use different communication modes. Therefore, if the base station indicates the communication mode by using the transmission parameter of the reference signal, the same synchronization channel may be transmitted before the reference signal is transmitted.

In the implementation of step A3, the first channel is a broadcast channel, that is, the base station needs to indicate, by using a transmission parameter of the broadcast channel, a communication mode to be used between the base station and the terminal device. In this case, different communication modes are corresponding to different transmission parameters of the broadcast channel, and the communication mode and the transmission parameter of the broadcast channel are in a one-to-one correspondence. In this case, a same synchronization channel and/or reference signal may be transmitted before the broadcast channel is transmitted, regardless of a communication mode used by the base station, so as to reduce complexity caused when different synchronization channels and reference signals need to be transmitted because the base station and the terminal device use different communication modes. Therefore, if the base station indicates the communication mode by using the transmission parameter of the broadcast channel, the same synchronization channel and/or reference signal may be transmitted before the broadcast channel is transmitted.

In the implementation of step A4, the first channel is a physical channel transmitted after a broadcast channel is transmitted, that is, the base station needs to indicate, by using a transmission parameter of the physical channel, a communication mode to be used between the base station and the terminal device. In this case, different communication modes are corresponding to different transmission parameters of the physical channel, and the communication mode and the transmission parameter of the physical channel are in a one-to-one correspondence. For example, the physical channel is a downlink shared channel for carrying system information, or the physical channel is an uplink control channel for scheduling system information. In this case, a same synchronization channel and/or reference signal and/or broadcast channel may be transmitted before the physical channel is transmitted, regardless of a communication mode used by the base station, so as to reduce complexity caused when different synchronization channels, reference signals, and broadcast channels need to be transmitted because the base station and the terminal device use different communication modes. Therefore, if the base station indicates the communication mode by using the transmission parameter of the physical channel, the same synchronization channel and/or reference signal and/or the broadcast channel may be transmitted before the physical channel is transmitted.

It should be noted that, in this embodiment of the present invention, the base station determines to indicate, by using the transmission parameter of the first channel, the communication mode used by the base station in step 202, and once the base station determines the communication mode to be used between the base station and the terminal device, the base station can determine a specific transmission parameter that should be configured for the first channel. In addition, in some other embodiments of the present invention, the base station may use a transmission parameter of a second channel in addition to the transmission parameter of the first channel, that is, the base station needs to indicate, by using both the transmission parameter of the first channel and the transmission parameter of the second channel, the communication mode used by the base station. Specifically, in some embodiments of the present invention, that the base station determines a transmission parameter of a first channel according to the determined communication mode in step 201 includes the following step:

B1. The base station determines the transmission parameter of the first channel and a transmission parameter of a second channel according to the determined communication mode, where the communication mode and a transmission parameter set are in a one-to-one correspondence, and the transmission parameter set includes the transmission parameter of the first channel and the transmission parameter of the second channel.

After the base station determines the communication mode to be used between the base station and the terminal device in step 201, the base station determines the transmission parameter set according to the one-to-one correspondence between the communication mode and the transmission parameter set. Different communication modes are corresponding to different transmission parameter sets. The transmission parameter set includes the transmission parameter of the first channel and the transmission parameter of the second channel. After the base station determines the communication mode to be used between the base station and the terminal device, the base station determines, according to the correspondence and the communication mode determined by the base station, the transmission parameter set corresponding to the communication mode. After determining the transmission parameter set, the base station completes configuration of the transmission parameter of the first channel and the transmission parameter of the second channel according to the transmission parameter set.

In an example, a plurality of communication modes may be configured between the base station and the terminal device. For example, there are a total of three communication modes between the base station and the terminal device, and the three communication modes are a communication mode a, a communication mode b, and a communication mode c. It is assumed that the communication mode and the transmission parameter set that are configured on the base station side are in the following one-to-one correspondence: The communication mode a is uniquely corresponding to a transmission parameter set x, the communication mode b is uniquely corresponding to a transmission parameter set y, and the communication mode c is uniquely corresponding to a transmission parameter set z. The transmission parameter set x includes a transmission parameter x1 of the first channel and a transmission parameter x2 of the second channel. The transmission parameter set y includes a transmission parameter y of the first channel and a transmission parameter y2 of the second channel. The transmission parameter set z includes a transmission parameter z1 of the first channel and a transmission parameter z2 of the second channel. The base station first determines a communication mode that should be used between the base station and the terminal device. For example, the base station determines to use the communication mode b, and then, the base station determines the transmission parameter set y according to the one-to-one correspondence and the communication mode b. The base station determines that the transmission parameter of the first channel is the transmission parameter y1, and the base station determines that the transmission parameter of the second channel is the transmission parameter y2.

It should be noted that, in this embodiment of the present invention, the first channel is a channel determined by the base station and used to indicate a communication mode. The first channel may be a channel of a known channel type, or may be a channel configured between the base station and the terminal device. A specific implementation of the first channel may depend on an application scenario. In addition, the second channel is a channel determined by the base station and used to indicate a communication mode. The second channel may be a channel of a known channel type, or may be a channel configured between the base station and the terminal device. A specific implementation of the second channel may depend on an application scenario. In an example, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information. For example, the first channel may be a synchronization channel, a reference signal, a broadcast channel, or a physical channel carrying system information, and the second channel may be a synchronization channel, a reference signal, a broadcast channel, or a physical channel carrying system information. For example, then both the first channel and the second channel represent a synchronization channel, the first channel may be specifically a primary synchronization channel, and the second channel may be specifically a secondary synchronization channel.

In an example, the first channel may be a synchronization channel, and the second channel may be a broadcast channel. Alternatively, the first channel may be a synchronization channel, and the second channel may be a physical channel carrying system information. Alternatively, the first channel may be a synchronization channel, and the second channel may be a reference signal. Alternatively, the first channel may be a reference signal, and the second channel may be a broadcast channel. Alternatively, the first channel may be a broadcast channel, and the second channel may be a physical channel carrying system information.

In some embodiments of the present invention, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel. The information in the first channel is information carried in the first channel, or a field or an information element carried in the first channel. The information in the second channel is information carried in the second channel, or a field or an information element carried in the second channel.

The transmission parameter of the first channel and/or the transmission parameter of the second channel may be implemented in a plurality of different manners, provided that these transmission parameters can be uniquely determined according to the communication mode determined by the base station and used between the base station and the terminal device. After the terminal device obtains the transmission parameter of the first channel and/or the transmission parameter of the second channel from the base station, the terminal device may uniquely determine, according to these transmission parameters, a communication mode that should be used and that is indicated by the base station to the terminal device.

In a specific implementation, the transmission parameter of the first channel is used as an example. There may be a unique correspondence between the sequence used by the first channel and the communication mode, and each of different sequences used by the first channel is uniquely corresponding to a communication mode. There may be a unique correspondence between the time resource used by the first channel and the communication mode, and each of different time resources used by the first channel is uniquely corresponding to a communication mode. There may be a unique correspondence between the frequency resource used by the first channel and the communication mode, and each of different frequency resources used by the first channel is uniquely corresponding to a communication mode. There may be a unique correspondence between the mapping manner used by the first channel and the communication mode, and each of different mapping manners used by the first channel is uniquely corresponding to a communication mode. There may be a unique correspondence between the spatial coding matrix used by the first channel and the communication mode, and each of different spatial coding matrices used by the first channel is uniquely corresponding to a communication mode. There may be a unique correspondence between the scrambling code used for scrambling the information in the first channel and the communication mode, and each of different scrambling codes used for scrambling information in the first channel is uniquely corresponding to a communication mode. There may be a unique correspondence between the information in the first channel and the communication mode, and each piece of different information in the first channel is uniquely corresponding to a communication mode. It should be noted that, in the foregoing embodiment, the information in the first channel may be information carried in the first channel or bit content carried in the first channel. In specific implementation, alternatively, the information in the first channel may specifically represent different information when channel types represented by the first channel are different. In addition, the information in the first channel may be a plurality of types of information in the first channel. For example, when the first channel is a broadcast channel, the information in the first channel may be a cyclic redundancy check bit, or may be an information bit carried in the broadcast channel.

In an example, the first channel is a synchronization channel, and the synchronization channel does not include a secondary synchronization channel. That is, the synchronization channel includes only a primary synchronization channel. For example, the primary synchronization channel indicates communication modes by using different sequences. For example, the primary synchronization channel indicates, by using a sequence a, that a first communication mode is used between the base station and the terminal device. The primary synchronization channel indicates, by using a sequence b, that a second communication mode is used between the base station and the terminal device. For another example, the primary synchronization channel indicates communication modes in different mapping manners. For example, the primary synchronization channel indicates, in a first mapping manner, that a first communication mode is used between the base station and the terminal device. The primary synchronization channel indicates, in a second mapping manner, that a second communication mode is used between the base station and the terminal device. For another example, the primary synchronization channel indicates communication modes by using different resources. For example, the primary synchronization channel indicates, by using a first frequency resource, that a first communication mode is used between the base station and the terminal device. The primary synchronization channel indicates, by using a second frequency resource, that a second communication mode is used between the base station and the terminal device.

For another example, the first channel is a reference signal, or a broadcast channel, or a physical channel carrying system information. In this embodiment of the present invention, a communication mode may be indicated by scrambling a cyclic redundancy check bit in the broadcast channel. In this embodiment of the present invention, a communication mode may be indicated by scrambling an information bit in the broadcast channel. More specifically, determining a communication mode according to a change in the transmission parameter of the first channel is the same as that described when the first channel is a synchronization channel, and is not repeated herein any further.

It should be noted that, in the foregoing example, the transmission parameter of the first channel is used as an example for description. An implementation of the transmission parameter of the second channel is similar to that of the transmission parameter of the first channel, and is not repeated herein any further.

Further, in some embodiments of the present invention, that the base station determines the transmission parameter of the first channel and a transmission parameter of a second channel according to the determined communication mode in step B1 may specifically include the following step;

B11. The base station determines a transmission parameter interrelationship according to the determined communication mode, where the transmission parameter interrelationship is an interrelationship between the transmission parameter of the first channel and the transmission parameter of the second channel.

In some embodiments of the present invention, that the base station determines the transmission parameter of the first channel and a transmission parameter of a second channel according to the determined communication mode may be specifically determining the transmission parameter interrelationship, that is, the base station determines the transmission parameter interrelationship according to the determined communication mode, so as to indicate, according to the transmission parameter interrelationship, the communication mode determined by the base station. The communication mode determined by the base station and the transmission parameter interrelationship are in a one-to-one correspondence, that is, different transmission parameter interrelationships are corresponding to different communication modes. The interrelationship is a relationship between the transmission parameter of the first channel and the transmission parameter of the second channel. After the terminal device obtains the transmission parameter of the first channel and the transmission parameter of the second channel from the base station, the terminal device determines, based on the interrelationship between the transmission parameter of the first channel and the transmission parameter of the second channel, the communication mode indicated by the base station to the terminal device.

In some embodiments of the present invention, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

The resource used by the first channel may be specifically one or more of a time resource, a frequency resource, a power resource, a space resource, a code resource, or a scrambling code. The resource used by the second channel may be specifically one or more of a time resource, a frequency resource, a power resource, a space resource, a code resource, or a scrambling code.

In an example, if a synchronization channel includes a first synchronization channel (for example, a primary synchronization channel) and a second synchronization channel (for example, a secondary synchronization channel), the first channel may be the first synchronization channel, and the second channel may be the second synchronization channel. The communication mode may be determined according to an interrelationship between the first synchronization channel and the second synchronization channel. For example, the interrelationship between the first synchronization channel and the second synchronization channel is a time interval between the first synchronization channel and the second synchronization channel. When the time interval between the first synchronization channel and the second synchronization channel is a first time interval, it indicates that a first communication mode is used between the base station and the terminal device. When the time interval between the first synchronization channel and the second synchronization channel is a second time interval, it indicates that a second communication mode is used between the base station and the terminal device. Further, when the time interval between the first synchronization channel and the second synchronization channel is a third time interval, it indicates that a third communication mode is used between the base station and the terminal device; or the like.

For another example, the interrelationship between the first synchronization channel and the second synchronization channel indicates a sequence used by the first synchronization channel and a sequence used by the second synchronization channel. When the first synchronization channel uses a sequence a and the second synchronization channel uses a sequence b, it indicates that a first communication mode is used between the base station and the terminal device. When the first synchronization channel uses a sequence a and the second synchronization channel uses a sequence c, it indicates that a second communication mode is used between the base station and the terminal device. Further, when the first synchronization channel uses a sequence a and the second synchronization channel uses a sequence d, it indicates that a third communication mode is used between the base station and the terminal device; or the like. The sequences a, b, c, and d herein are different sequences.

For another example, when the first synchronization channel uses a sequence a1 and the second synchronization channel uses a sequence b1, it indicates that a first communication mode is used between the base station and the terminal device. When the first synchronization channel uses a sequence a1 and the second synchronization channel uses a sequence b2, it indicates that a second communication mode is used between the base station and the terminal device. When the first synchronization channel uses a sequence a2 and the second synchronization channel uses a sequence b1, it indicates that a third communication mode is used between the base station and the terminal device. When the first synchronization channel uses a sequence a2 and the second synchronization channel uses a sequence b2, it indicates that a fourth communication mode is used between the base station and the terminal device. The sequences a1, a2, b1, and b2 herein are different sequences.

For another example, the interrelationship between the first synchronization channel and the second synchronization channel indicates a mapping manner used by the first synchronization channel and a mapping manner used by the second synchronization channel. For example, when the first synchronization channel uses a first mapping rule and the second synchronization channel uses a second mapping rule, it indicates that a first communication mode is used between the base station and the terminal device. When the first synchronization channel uses a first mapping rule and the second synchronization channel uses a third mapping rule, it indicates that a second communication mode is used between the base station and the terminal device. The first mapping rule may be the same as the second mapping rule. The second mapping rule needs to be different from the third mapping rule. For example, the third mapping rule is a variant or shift of the second mapping rule. For example, the second mapping rule is successively performing mapping onto resource elements in ascending order of frequencies, and the third mapping rule is successively performing mapping onto resource elements in descending order of frequencies.

For another example, the interrelationship between the first synchronization channel and the second synchronization channel indicates a resource used by the first synchronization channel and a resource used by the second synchronization channel. For example, when the first synchronization channel uses a first resource (the resource is one or more of a time resource, a frequency resource, a power resource, a space resource, a code resource, or a scrambling code) and the second synchronization channel uses a second resource, it indicates that a first communication mode is used between the base station and the terminal device. When the first synchronization channel uses a first resource and the second synchronization channel uses a third resource, it indicates that a second communication mode is used between the base station and the terminal device.

203. The base station transmits the first channel to the terminal device.

In this embodiment of the present invention, after the base station determines the transmission parameter of the first channel according to the communication mode to be used by the base station, the base station may transmit the first channel to the terminal device, where the transmission parameter of the first channel may carry information indicating the communication mode to be used by the base station. Therefore, the terminal device can obtain the first channel, and can determine, according to the transmission parameter of the first channel, the communication mode indicated by the base station to the terminal device, so that a process of indicating the communication mode to the terminal device by the base station is completed, and the terminal device can determine a specific communication mode used when the base station and the terminal device communicate with each other.

In some embodiments of the present invention, if the base station executes the implementation of step B1, that the base station transmits the first channel to the terminal device in step 203 may specifically include the following step:

C1. The base station sends both the first channel and the second channel to the terminal device.

That is, when two channels (that is, the first channel and the second channel) are configured between the base station and the terminal device, in the implementation described in step B1, the base station determines the transmission parameter of the first channel and the transmission parameter of the second channel according to the determined communication mode. In this case, after the transmission parameter of the second channel is determined according to the communication mode to be used between the base station and the terminal device, the base station may send the second channel to the terminal device in addition to sending the first channel to the terminal device. Correspondingly, the terminal device may receive the first channel sent by the base station and the second channel sent by the base station. For example, the first channel may be a primary synchronization channel, and the second channel may be a secondary synchronization channel. The communication mode to be used by the base station and the terminal device may be indicated by using a transmission parameter of the primary synchronization channel and a transmission parameter of the secondary synchronization channel. For example, different communication modes may be distinguished according to a relative location of the primary synchronization channel and the secondary synchronization channel.

It can be learned from the foregoing descriptions of the present invention with reference to this embodiment that, the base station first determines the communication mode to be used between the base station and the terminal device; after the base station determines the communication mode that should be used, the base station determines the transmission parameter of the first channel according to the determined communication mode; finally, the base station transmits the first channel to the terminal device. Because the base station can determine the transmission parameter of the first channel according to the one-to-one correspondence between the communication mode and the transmission parameter of the first channel, the first channel transmitted by the base station to the terminal device can indicate the communication mode used by the base station, so as to implement indication of the communication mode. In addition, after the terminal device determines the first channel sent by the base station to the terminal device, the terminal device can obtain the transmission parameter of the first channel from the first channel, and the terminal device can determine, according to the one-to-one correspondence between the communication mode and the transmission parameter of the first channel, the communication mode used by the base station. According to the channel transmission method provided in this embodiment of the present invention, determining a communication mode by terminal device and indicating the communication mode by a base station can be implemented. Therefore, the base station and the terminal device communicate with each other in the communication mode indicated by the base station. This improves flexibility of system design, reduces complexity of blindly detecting a communication mode by the terminal device, and reduces power consumption of the terminal device.

In this embodiment of the present invention, one or more of frame structures, reference signals, content carried in broadcast channels, or system information in different communication modes may be different. This embodiment of the present invention further provides an implementation in which in different modes, a broadcast channel carries different master information blocks (MIB). An example is described as follows:

For example, in a first communication mode, the MIB includes one or more of the following: a system radio frame number indication, scheduling information of a system information block1 (for example, a system information block 1), a physical resource block location of a system information block, a system bandwidth, an indication of an antenna port quantity, or a frequency hopping indication. When the terminal device determines that the base station has indicated the first communication mode, the terminal device interprets content of the MIB according to a structure of the MIB used in the first communication mode. For example, if the base station has indicated the first communication mode to the terminal device, a specific example of a quantity of information bits included in the MIB is as follows: A system frame number (SFN) has three bits (English: bits), configuration information of a machine-system information block 1 (M-SIB1) has two to four bits, a physical resource block location of an M-SIB1 has one or two bits, a system bandwidth has two or three bits, an antenna port quantity has one or two bits, or a frequency hopping indication has one or two bits.

For example, in a second communication mode, the MIB includes one or more of the following: a system radio frame number indication or scheduling information of a system information block (for example, a system information block 1). When the terminal device determines that the base station has indicated the second communication mode, the terminal device interprets content of the MIB according to a structure of the MIB used in the second communication mode. For example, if the base station has indicated the second communication mode to the terminal device, a specific example of a quantity of information bits included in the MIB is as follows: An SFN has eight bits or configuration information of an M-SIB1 has two or three bits.

It can be learned from the descriptions of the foregoing embodiment that, in this embodiment of the present invention, after determining the communication mode, the terminal device may communicate with the base station according to one or more of a frame structure, a synchronization channel, a reference signal, a broadcast channel, a control channel, a data channel, or a common message corresponding to the determined communication mode. Different communication modes may be corresponding to one or more of different frame structures, different synchronization channels, different reference signals, different broadcast channels, different control channels, different data channels, or different common messages. In this way, quite high flexibility is provided for system design, so that different designs are applied to different communication modes, and resource utilization efficiency of a system is improved.

Figure 4:
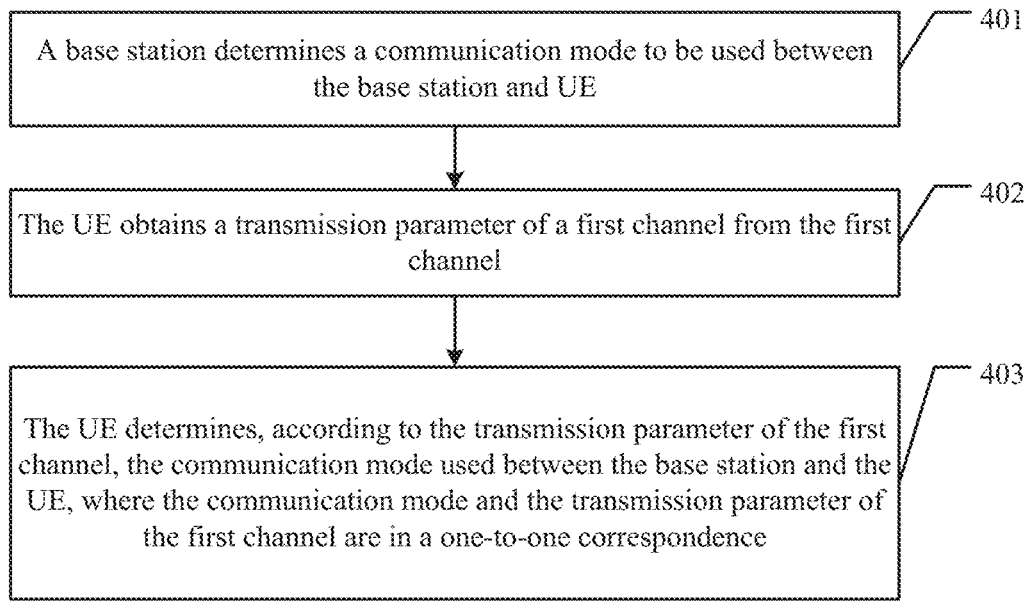
FIG. 4 is a schematic block flowchart of another channel transmission method according to an embodiment of the present invention.

In the foregoing embodiment, the channel transmission method provided in the embodiments of the present invention is described from a perspective of a base station. The channel transmission method provided in the embodiments of the present invention is described in the following from a perspective of terminal device. Another embodiment of a channel transmission method in the present invention may be applied to a scenario in which a base station sends a channel to terminal device. Referring to FIG. 4, the channel transmission method may include the following steps.

401. Terminal device determines a first channel transmitted by a base station.

In this embodiment of the present invention, after the base station determines a transmission parameter of the first channel according to a communication mode used by the base station, the base station may transmit the first channel to the terminal device, and the terminal device determines the first channel transmitted by the base station, where the transmission parameter of the first channel may carry information indicating the communication mode used by the base station.

In some embodiments of the present invention, the channel transmission method provided in this embodiment of the present invention may further include one of the following steps:

D1. When the first channel is a synchronization channel, the terminal device determines that different communication modes are corresponding to different transmission parameters of the synchronization channel.

D2. When the first channel is a reference signal, the terminal device determines that different communication modes are corresponding to a same transmission parameter of a synchronization channel.

D3. When the first channel is a broadcast channel, the terminal device determines that different communication modes are corresponding to a same transmission parameter of a synchronization channel and/or a same transmission parameter of a reference signal.

D4. When the first channel is a physical channel transmitted after a broadcast channel is transmitted, the terminal device determines that different communication modes are corresponding to at least one of a same transmission parameter of a synchronization channel, a same transmission parameter of a reference signal, or a same transmission parameter of the broadcast channel.

For example, the terminal device receives, in the following sequence, various channels sent by the base station: a synchronization channel, a reference signal, a broadcast channel, and a physical channel carrying system information. Therefore, in the implementation of step D1, the first channel is a synchronization channel, and the terminal device determines that different communication modes are corresponding to different transmission parameters of the synchronization channel, and the communication mode and the transmission parameter of the synchronization channel are in a one-to-one correspondence.

In the implementation of step D2, the first channel is a reference signal, and the terminal device determines that different communication modes are corresponding to different transmission parameters of the reference signal, and the communication mode and the transmission parameter of the reference signal are in a one-to-one correspondence. In this case, a same synchronization channel may be transmitted before the reference signal is transmitted, regardless of a communication mode used by the base station, so as to reduce complexity caused when different synchronization channels need to be transmitted because the base station and the terminal device use different communication modes. Therefore, if the base station indicates the communication mode by using the transmission parameter of the reference signal, the same synchronization channel may be transmitted before the reference signal is transmitted.

In the implementation of step D3, the first channel is a broadcast channel, and the terminal device determines that different communication modes are corresponding to different transmission parameters of the broadcast channel, and the communication mode and the transmission parameter of the broadcast channel are in a one-to-one correspondence. In this case, a same synchronization channel and/or reference signal may be transmitted before the broadcast channel is transmitted, regardless of a communication mode used by the base station, so as to reduce complexity caused when different synchronization channels and reference signals need to be transmitted because the base station and the terminal device use different communication modes. Therefore, if the base station indicates the communication mode by using the transmission parameter of the broadcast channel, the same synchronization channel and/or reference signal may be transmitted before the broadcast channel is transmitted.

In the implementation of step D4, the first channel is a physical channel transmitted after a broadcast channel is transmitted, and the terminal device determines that different communication modes are corresponding to different transmission parameters of the physical channel, and the communication mode and the transmission parameter of the physical channel are in a one-to-one correspondence. In this case, a same synchronization channel and/or reference signal and/or broadcast channel may be transmitted before the physical channel is transmitted, regardless of a communication mode used by the base station, so as to reduce complexity caused when different synchronization channels, reference signals, and broadcast channels need to be transmitted because the base station and the terminal device use different communication modes. Therefore, if the base station indicates the communication mode by using the transmission parameter of the physical channel, the same synchronization channel and/or reference signal and/or the broadcast channel may be transmitted before the physical channel is transmitted.

402. The terminal device obtains a transmission parameter of the first channel from the first channel.

In this embodiment of the present invention, the terminal device determines that the base station has transmitted the first channel to the terminal device, and after the terminal device determines the first channel, the terminal device may obtain the transmission parameter of the first channel from the first channel.

In this embodiment of the present invention, the first channel is a channel determined by the base station and used to indicate a communication mode. The first channel may be a channel of a known channel type, or may be a channel configured between the base station and the terminal device. A specific implementation of the first channel may depend on an application scenario. In addition, the second channel is a channel determined by the base station and used to indicate a communication mode. The second channel may be a channel of a known channel type, or may be a channel configured between the base station and the terminal device. A specific implementation of the second channel may depend on an application scenario. In an example, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information. For example, the first channel may be a synchronization channel, a reference signal, a broadcast channel, or a physical channel carrying system information, and the second channel may be a synchronization channel, a reference signal, a broadcast channel, or a physical channel carrying system information. For example, when both the first channel and the second channel represent a synchronization channel, the first channel may be specifically a primary synchronization channel, and the second channel may be specifically a secondary synchronization channel.

In some embodiments of the present invention, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel. The information in the first channel is information carried in the first channel, or a field or an information element carried in the first channel. The information in the second channel is information carried in the second channel, or a field or an information element carried in the second channel.

The transmission parameter of the first channel and/or the transmission parameter of the second channel may be implemented in a plurality of different manners, provided that these transmission parameters can be uniquely determined according to the communication mode determined by the base station and used between the base station and the terminal device. After the terminal device obtains the transmission parameter of the first channel and/or the transmission parameter of the second channel from the base station, the terminal device may uniquely determine, according to these transmission parameters, a communication mode that should be used and that is indicated by the base station to the terminal device.

In a specific implementation, the transmission parameter of the first channel is used as an example. There may be a unique correspondence between the sequence used by the first channel and the communication mode, and each of different sequences used by the first channel is uniquely corresponding to a communication mode. There may be a unique correspondence between the time resource used by the first channel and the communication mode, and each of different time resources used by the first channel is uniquely corresponding to a communication mode. There may be a unique correspondence between the frequency resource used by the first channel and the communication mode, and each of different frequency resources used by the first channel is uniquely corresponding to a communication mode. There may be a unique correspondence between the mapping manner used by the first channel and the communication mode, and each of different mapping manners used by the first channel is uniquely corresponding to a communication mode. There may be a unique correspondence between the spatial coding matrix used by the first channel and the communication mode, and each of different spatial coding matrices used by the first channel is uniquely corresponding to a communication mode. There may be a unique correspondence between the scrambling code used for scrambling the information in the first channel and the communication mode, and each of different scrambling codes used for scrambling information in the first channel is uniquely corresponding to a communication mode. There may be a unique correspondence between the information in the first channel and the communication mode, and each piece of different information in the first channel is uniquely corresponding to a communication mode. It should be noted that, in the foregoing embodiment, the information in the first channel may be information carried in the first channel or bit content carried in the first channel. In specific implementation, alternatively, the information in the first channel may specifically represent different information when channel types represented by the first channel are different. In addition, the information in the first channel may be a plurality of types of information in the first channel. For example, when the first channel is a broadcast channel, the information in the first channel may be a cyclic redundancy check bit, or may be an information bit carried in the broadcast channel.

403. The terminal device determines, according to the transmission parameter of the first channel, a communication mode used between the base station and the terminal device, where the communication mode and the transmission parameter of the first channel are in a one-to-one correspondence.

In this embodiment of the present invention, after the terminal device obtains the transmission parameter of the first channel, different communication modes are corresponding to different transmission parameters of the first channel, and the communication mode and the transmission parameter of the first channel are in a one-to-one correspondence. The one-to-one correspondence between the communication mode and the transmission parameter of the first channel may be pre-defined by a system, or may be determined by the base station and notified by the base station to the terminal device. Therefore, the terminal device can determine, according to the transmission parameter, the communication mode indicated by the base station to the terminal device. The terminal device can determine, according to the transmission parameter of the first channel, the communication mode indicated by the base station to the terminal device, so that a process of indicating the communication mode to the terminal device by the base station is completed, and the terminal device can determine a specific communication mode used when the base station and the terminal device communicate with each other. In an example, a plurality of communication modes may be configured between the base station and the terminal device. For example, there are a total of three communication modes between the base station and the terminal device, and the three communication modes are a communication mode a, a communication mode b, and a communication mode c, and are corresponding to different transmission parameters of the first channel. It is assumed that the communication mode and the transmission parameter of the first channel that are configured on the base station side are in the following one-to-one correspondence: The communication mode a is uniquely corresponding to a transmission parameter x, the communication mode b is uniquely corresponding to a transmission parameter y, and the communication mode c is uniquely corresponding to a transmission parameter z. The terminal device first determines that the transmission parameter of the first channel is the transmission parameter y, and the terminal device determines, according to the one-to-one correspondence and according to a case in which the transmission parameter of the first channel is the transmission parameter y, that the communication mode indicated by the base station to the terminal device is the communication mode b.

In some embodiments of the present invention, the channel transmission method provided in the present invention may further include the following steps:

E1. The terminal device determines a second channel transmitted by the base station.

E2. The terminal device obtains a transmission parameter of the second channel from the second channel.

It can be learned from the example described in the foregoing embodiment that, in this embodiment of the present invention, the base station may send both the first channel and the second channel to the terminal device. The terminal device may further perform steps E1 and E2 in addition to performing steps 401 and 402. In this way, the terminal device can obtain the transmission parameter of the first channel and the transmission parameter of the second channel. In this implementation scenario, that the terminal device determines, according to the transmission parameter of the first channel, a communication mode used between the base station and the terminal device in step 403 may specifically include the following steps:

F1. The terminal device determines the communication mode according to the transmission parameter of the first channel and the transmission parameter of the second channel, where the communication mode and a transmission parameter set are in a one-to-one correspondence, and the transmission parameter set includes the transmission parameter of the first channel and the transmission parameter of the second channel. Different communication modes are corresponding to different transmission parameter sets. The transmission parameter set includes the transmission parameter of the first channel and the transmission parameter of the second channel. After the terminal device obtains the transmission parameter of the first channel and the transmission parameter of the second channel, the terminal device determines the transmission parameter set corresponding to the transmission parameter of the first channel and the transmission parameter of the second channel. The transmission parameter set and the communication mode may be in a one-to-one correspondence. Therefore, the terminal device can determine a communication mode corresponding to the obtained transmission parameter set, so that the terminal device can obtain the communication mode indicated by the base station to the terminal device.

Further, in some embodiments of the present invention, that the terminal device determines the communication mode according to the transmission parameter of the first channel and the transmission parameter of the second channel in step F1 may specifically include the following steps:

F11. The terminal device determines the communication mode according to a transmission parameter interrelationship, where the transmission parameter interrelationship is an interrelationship between the transmission parameter of the first channel and the transmission parameter of the second channel.

In some embodiments of the present invention, that the base station determines the transmission parameter of the first channel and the transmission parameter of the second channel according to the determined communication mode may be specifically determining the transmission parameter interrelationship, that is, the base station determines the transmission parameter interrelationship according to the determined communication mode, so as to indicate, according to the transmission parameter interrelationship, the communication mode determined by the base station. The communication mode determined by the base station and the transmission parameter interrelationship are in a one-to-one correspondence, that is, different transmission parameter interrelationships are corresponding to different communication modes. The interrelationship is a relationship between the transmission parameter of the first channel and the transmission parameter of the second channel. After the terminal device obtains the transmission parameter of the first channel and the transmission parameter of the second channel from the base station, the terminal device determines, based on the interrelationship between the transmission parameter of the first channel and the transmission parameter of the second channel, the communication mode indicated by the base station to the terminal device.

In some embodiments of the present invention, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

The resource used by the first channel may be specifically one or more of a time resource, a frequency resource, a power resource, a space resource, a code resource, or a scrambling code. The resource used by the second channel may be specifically one or more of a time resource, a frequency resource, a power resource, a space resource, a code resource, or a scrambling code.

In an example, if a synchronization channel includes a first synchronization channel (for example, a primary synchronization channel) and a second synchronization channel (for example, a secondary synchronization channel), the first channel may be the first synchronization channel, and the second channel may be the second synchronization channel. The communication mode may be determined according to an interrelationship between the first synchronization channel and the second synchronization channel. For example, the interrelationship between the first synchronization channel and the second synchronization channel indicates a time interval between the first synchronization channel and the second synchronization channel. When the time interval between the first synchronization channel and the second synchronization channel is a first time interval, it indicates that a first communication mode is used between the base station and the terminal device. When the time interval between the first synchronization channel and the second synchronization channel is a second time interval, it indicates that a second communication mode is used between the base station and the terminal device. Further, when the time interval between the first synchronization channel and the second synchronization channel is a third time interval, it indicates that a third communication mode is used between the base station and the terminal device; or the like.

In some embodiments of the present invention, the communication mode includes at least one of the following modes: an in-band mode, a guardband mode, or an standalone mode. In a transmission bandwidth of a legacy carrier, not only a legacy mode (for example, for an LTE system, a legacy mode is an LTE air interface standard) but also another communication mode used for another terminal device are supported, and the another communication mode used for another terminal device is referred to as an in-band mode for short, and the in-band mode may also be referred to as a sharing mode. For another example, in another communication mode, another communication mode is supported in a guard bandwidth of a legacy carrier. For example, a first communication mode is used in a transmission bandwidth of the legacy carrier, and a second communication mode is used in the guard bandwidth of the legacy carrier (generally, in the first communication mode, this part of bandwidth is not used to transmit data, another signal, or the like). For convenience, a mode in which the second communication mode is used in the guard bandwidth of the legacy carrier for communication is referred to as a guardband mode for short. For another example, in another communication mode, a first communication mode is supported on a legacy carrier, and a second communication mode is supported on another frequency resource (that is, on a frequency resource of a non-legacy carrier). For convenience, a mode in which the second communication mode is used on the another frequency resource (that is, on the frequency resource of the non-legacy carrier) for communication is referred to as an standalone mode for short.

It can be learned from the foregoing descriptions of the present invention with reference to this embodiment that, the terminal device determines the first channel transmitted by the base station, the terminal device obtains the transmission parameter of the first channel from the first channel, and the terminal device determines, according to the transmission parameter of the first channel, the communication mode used between the base station and the terminal device, where the communication mode and the transmission parameter of the first channel are in a one-to-one correspondence, so as to implement determining of the communication mode. In addition, after the terminal device determines the first channel sent by the base station to the terminal device, the terminal device can obtain the transmission parameter of the first channel from the first channel, and the terminal device can determine, according to the one-to-one correspondence between the communication mode and the transmission parameter of the first channel, the communication mode used by the base station. According to the channel transmission method provided in this embodiment of the present invention, determining a communication mode by terminal device and indicating the communication mode by a base station can be implemented. Therefore, the base station and the terminal device communicate with each other in the communication mode indicated by the base station. This improves flexibility of system design, reduces complexity of blindly detecting a communication mode by the terminal device, and reduces power consumption of the terminal device.

It should be noted that, for ease of description, the foregoing method embodiments are described as a series of action combinations. However, persons skilled in the art should know that, the present invention is not limited by the described action sequence, because some steps may be performed in another sequence or simultaneously according to an embodiment of present disclosure. In addition, persons skilled in the art should also understand that all the embodiments described in this specification are embodiments, and the actions and modules in the embodiments are not necessarily mandatory to the present invention.

To better implement the foregoing solutions in the embodiments of the present invention, the following further provides related apparatuses for implementing the foregoing solutions.

Figure 5:
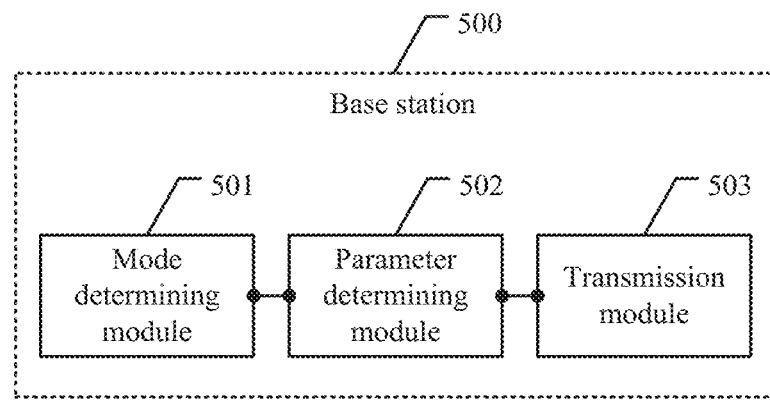
FIG. 5 is a schematic structural diagram of composition of a base station according to an embodiment of the present invention.

Referring to FIG. 5, a base station 500 provided in an embodiment of the present invention may include a mode determining module 501, a parameter determining module 502, and a transmission module 503.

The mode determining module 501 is configured to determine a communication mode to be used between the base station and terminal device.

The parameter determining module 502 is configured to determine a transmission parameter of a first channel according to the determined communication mode, where the communication mode and the transmission parameter of the first channel are in a one-to-one correspondence.

The transmission module 503 is configured to transmit the first channel to the terminal device.

In some embodiments of the present invention, the parameter determining module 502 is specifically configured to determine the transmission parameter of the first channel and a transmission parameter of a second channel according to the determined communication mode, where the communication mode and a transmission parameter set are in a one-to-one correspondence, and the transmission parameter set includes the transmission parameter of the first channel and the transmission parameter of the second channel.

The transmission module 503 is specifically configured to send both the first channel and the second channel to the terminal device.

In some embodiments of the present invention, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

In some embodiments of the present invention, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information.

In some embodiments of the present invention, the parameter determining module 502 is specifically configured to: determine a transmission parameter of a synchronization channel according to the determined communication mode, where different communication modes are corresponding to different transmission parameters of the synchronization channel; or determine a transmission parameter of a reference signal according to the determined communication mode, where different communication modes are corresponding to a same transmission parameter of a synchronization channel; or determine a transmission parameter of a broadcast channel according to the determined communication mode, where different communication modes are corresponding to a same transmission parameter of a synchronization channel and/or a same transmission parameter of a reference signal; or determine, according to the determined communication mode, a transmission parameter of a physical channel transmitted after a broadcast channel is transmitted, where different communication modes are corresponding to at least one of a same transmission parameter of a synchronization channel, a same transmission parameter of a reference signal, or a same transmission parameter of the broadcast channel.

In some embodiments of the present invention, the parameter determining module 502 is specifically configured to determine a transmission parameter interrelationship according to the determined communication mode, where the transmission parameter interrelationship is an interrelationship between the transmission parameter of the first channel and the transmission parameter of the second channel.

In some embodiments of the present invention, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

In some embodiments of the present invention, the communication mode includes at least one of the following modes: an in-band mode, a guardband mode, or an stand-alone mode.

It can be learned from the foregoing descriptions of the present invention with reference to this embodiment that, the base station first determines the communication mode to be used between the base station and the terminal device; after the base station determines the communication mode that should be used, the base station determines the transmission parameter of the first channel according to the determined communication mode; finally, the base station transmits the first channel to the terminal device. Because the base station can determine the transmission parameter of the first channel according to the one-to-one correspondence between the communication mode and the transmission parameter of the first channel, the first channel transmitted by the base station to the terminal device can indicate the communication mode used by the base station, so as to implement indication of the communication mode. In addition, after the terminal device determines the first channel sent by the base station to the terminal device, the terminal device can obtain the transmission parameter of the first channel from the first channel, and the terminal device can determine, according to the one-to-one correspondence between the communication mode and the transmission parameter of the first channel, the communication mode used by the base station, so as to complete determining of the communication mode. According to the channel transmission method provided in this embodiment of the present invention, determining a communication mode by terminal device and indicating the communication mode by a base station can be implemented. Therefore, the base station and the terminal device communicate with each other in the communication mode indicated by the base station. This improves flexibility of system design, reduces complexity of blindly detecting a communication mode by the terminal device, and reduces power consumption of the terminal device.

Figure 6:
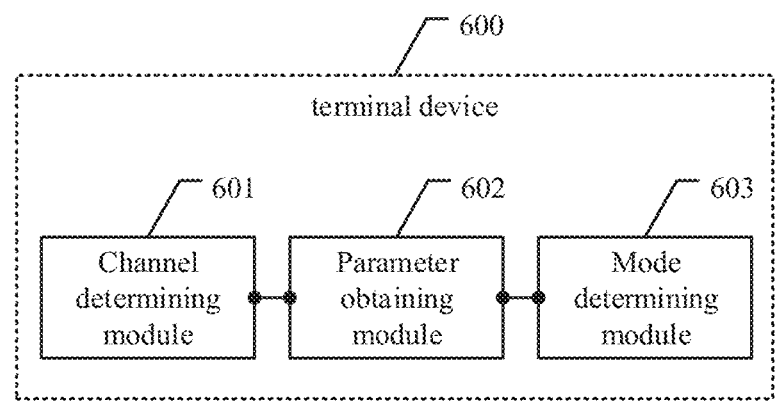
FIG. 6 is a schematic structural diagram of composition of terminal device according to an embodiment of the present invention.

Referring to FIG. 6, terminal device 600 provided in an embodiment of the present invention may include a channel determining module 601, a parameter obtaining module 602, and a mode determining module 603.

The channel determining module 601 is configured to determine a first channel transmitted by a base station.

The parameter obtaining module 602 is configured to obtain a transmission parameter of the first channel from the first channel.

The mode determining module 603 is configured to determine, according to the transmission parameter of the first channel, a communication mode used between the base station and the terminal device, where the communication mode and the transmission parameter of the first channel are in a one-to-one correspondence.

In some embodiments of the present invention, the channel determining module 601 is further configured to determine a second channel transmitted by the base station;

the parameter obtaining module 602 is further configured to obtain a transmission parameter of the second channel from the second channel; and the mode determining module 603 is specifically configured to determine the communication mode according to the transmission parameter of the first channel and the transmission parameter of the second channel, where the communication mode and a transmission parameter set are in a one-to-one correspondence, and the transmission parameter set includes the transmission parameter of the first channel and the transmission parameter of the second channel.

In some embodiments of the present invention, the transmission parameter of the first channel includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

In some embodiments of the present invention, the first channel includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information.

In some embodiments of the present invention, the parameter obtaining module 602 is further configured to: when the first channel is a synchronization channel, determine that different communication modes are corresponding to different transmission parameters of the synchronization channel; or when the first channel is a reference signal, determine that different communication modes are corresponding to a same transmission parameter of a synchronization channel; or when the first channel is a broadcast channel, determine that different communication modes are corresponding to a same transmission parameter of a synchronization channel and/or a same transmission parameter of the reference signal; or when the first channel is a physical channel transmitted after a broadcast channel is transmitted, determine that different communication modes are corresponding to at least one of a same transmission parameter of a synchronization channel, a same transmission parameter of a reference signal, or a same transmission parameter of the broadcast channel.

In some embodiments of the present invention, the mode determining module 603 is specifically configured to determine the communication mode according to a transmission parameter interrelationship, where the transmission parameter interrelationship is an interrelationship between the transmission parameter of the first channel and the transmission parameter of the second channel.

In some embodiments of the present invention, the transmission parameter interrelationship includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

In some embodiments of the present invention, the communication mode includes at least one of the following modes: an in-band mode, a guardband mode, or an stand-alone mode.

It can be learned from the foregoing descriptions of the present invention with reference to this embodiment that, the terminal device determines the first channel transmitted by the base station, the terminal device obtains the transmission parameter of the first channel from the first channel, and the terminal device determines, according to the transmission parameter of the first channel, the communication mode used between the base station and the terminal device, where the communication mode and the transmission parameter of the first channel are in a one-to-one correspondence, so as to implement determining of the communication mode. In addition, after the terminal device determines the first channel sent by the base station to the terminal device, the terminal device can obtain the transmission parameter of the first channel from the first channel, and the terminal device can determine, according to the one-to-one correspondence between the communication mode and the transmission parameter of the first channel, the communication mode used by the base station. According to the channel transmission method provided in this embodiment of the present invention, determining a communication mode by terminal device and indicating the communication mode by a base station can be implemented. Therefore, the base station and the terminal device communicate with each other in the communication mode indicated by the base station. This improves flexibility of system design, reduces complexity of blindly detecting a communication mode by the terminal device, and reduces power consumption of the terminal device.

It should be noted that, content such as information exchange between modules/units of the foregoing apparatus and the implementation processes thereof is based on the same conception as the method embodiments of the present invention and brings the same technical effects as those of the method embodiments of the present invention. For specific content, refer to the descriptions in the foregoing method embodiments. No repetition is given here any further.

An embodiment of the present invention further provides a computer storage medium. The computer storage medium stores a program, and the program is used to perform some or all of steps described in the foregoing method embodiments.

Figure 7:
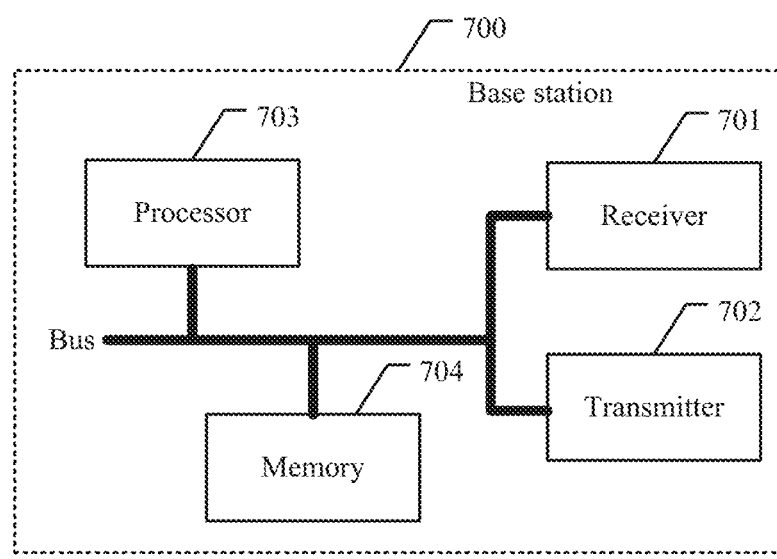
FIG. 7 is a schematic structural diagram of composition of another base station according to an embodiment of the present invention.

The following describes another base station provided in an embodiment of the present invention. Referring to FIG. 7, a base station 700 includes:

a receiver 701, a transmitter 702, a processor 703, and a memory 704 (there may be one or more processors 703 in the base station 700, and an example in which there is one processor is used in FIG. 7). In some embodiments of the present invention, the receiver 701, the transmitter 702, the processor 703, and the memory 704 may be connected by using a bus or in another manner. In FIG. 7, a bus connection is used as an example.

The processor 703 is configured to perform the following steps:

determining a communication mode to be used between the base station and terminal device;

determining a transmission parameter of a first channel according to the determined communication mode, where the communication mode and the transmission parameter of the first channel are in a one-to-one correspondence; and transmitting the first channel to the terminal device.

In some embodiments of the present invention, the processor 703 is specifically configured to perform the following steps:

determining the transmission parameter of the first channel and a transmission parameter of a second channel according to the determined communication mode, where the communication mode and a transmission parameter set are in a one-to-one correspondence, and the transmission parameter set includes the transmission parameter of the first channel and the transmission parameter of the second channel; and sending both the first channel and the second channel to the terminal device.

In some embodiments of the present invention, the transmission parameter of the first channel stored in the memory 704 includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

In some embodiments of the present invention, the first channel stored in the memory 704 includes at least one of the following content: a synchronization channel, a reference signal, a broadcast channel, or a physical channel carrying system information; and/or the second channel includes at least one of the following content: a synchronization channel, a reference signal, a broadcast channel, or a physical channel carrying system information.

In some embodiments of the present invention, the processor 703 is specifically configured to perform the following step:

determining a transmission parameter of a synchronization channel according to the determined communication mode, where different communication modes are corresponding to different transmission parameters of the synchronization channel; or determining a transmission parameter of a reference signal according to the determined communication mode, where different communication modes are corresponding to a same transmission parameter of a synchronization channel; or determining a transmission parameter of a broadcast channel according to the determined communication mode, where different communication modes are corresponding to a same transmission parameter of a synchronization channel and/or a same transmission parameter of a reference signal; or determining, according to the determined communication mode, a transmission parameter of a physical channel transmitted after a broadcast channel is transmitted, where different communication modes are corresponding to at least one of a same transmission parameter of a synchronization channel, a same transmission parameter of a reference signal, or a same transmission parameter of the broadcast channel.

In some embodiments of the present invention, the processor 703 is specifically configured to perform the following step:

determining a transmission parameter interrelationship according to the determined communication mode, where the transmission parameter interrelationship is an interrelationship between the transmission parameter of the first channel and the transmission parameter of the second channel.

In some embodiments of the present invention, the transmission parameter interrelationship stored in the memory 704 includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

In some embodiments of the present invention, the communication mode stored in the memory 704 includes at least one of the following modes: an in-band mode, a guardband mode, or an standalone mode.

It can be learned from the foregoing descriptions of the present invention with reference to this embodiment that, the base station first determines the communication mode to be used between the base station and the terminal device; after the base station determines the communication mode that should be used, the base station determines the transmission parameter of the first channel according to the determined communication mode; finally, the base station transmits the first channel to the terminal device. Because the base station can determine the transmission parameter of the first channel according to the one-to-one correspondence between the communication mode and the transmission parameter of the first channel, the first channel transmitted by the base station to the terminal device can indicate the communication mode used by the base station, so as to implement indication of the communication mode. In addition, after the terminal device determines the first channel sent by the base station to the terminal device, the terminal device can obtain the transmission parameter of the first channel from the first channel, and the terminal device can obtain, according to the one-to-one correspondence between the communication mode and the transmission parameter of the first channel, the communication mode used by the base station. According to the channel transmission method provided in this embodiment of the present invention, determining a communication mode by terminal device and indicating the communication mode by a base station can be implemented. Therefore, the base station and the terminal device communicate with each other in the communication mode indicated by the base station. This improves flexibility of system design, reduces complexity of blindly detecting a communication mode by the terminal device, and reduces power consumption of the terminal device.

Figure 8:
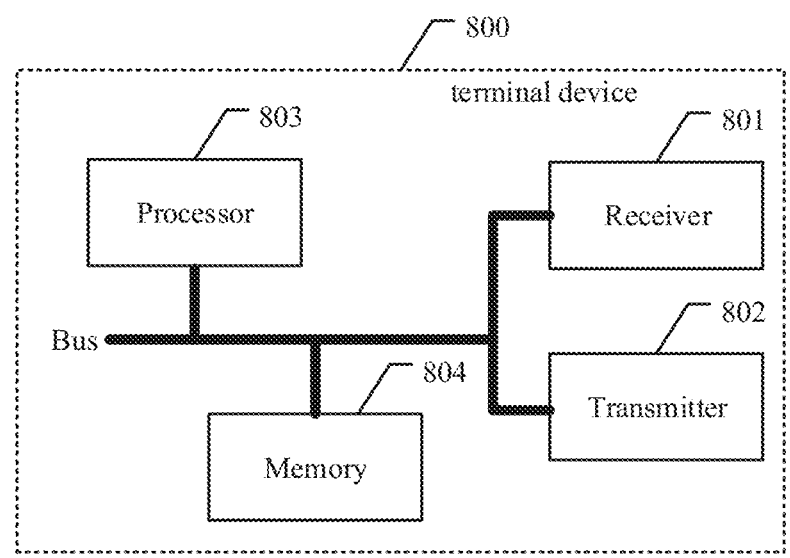
FIG. 8 is a schematic structural diagram of composition of another terminal device according to an embodiment of the present invention.

The following describes another terminal device provided in an embodiment of the present invention. Referring to FIG. 8, terminal device 800 includes:

a receiver 801, a transmitter 802, a processor 803, and a memory 804 (there may be one or more processors 803 in the terminal device 800, and an example in which there is one processor is used in FIG. 8). In some embodiments of the present invention, the receiver 801, the transmitter 802, the processor 803, and the memory 804 may be connected by using a bus or in another manner. In FIG. 8, a bus connection is used as an example.

The processor 803 is configured to perform the following steps:

determining a first channel transmitted by a base station;

obtaining a transmission parameter of the first channel from the first channel; and determining, according to the transmission parameter of the first channel, a communication mode used between the base station and the terminal device, where the communication mode and the transmission parameter of the first channel are in a one-to-one correspondence.

In some embodiments of the present invention, the processor 803 is further configured to perform the following steps:

determining a second channel transmitted by the base station; and obtaining a transmission parameter of the second channel from the second channel; and further, the processor 803 is specifically configured to perform the following step:

determining the communication mode according to the transmission parameter of the first channel and the transmission parameter of the second channel, where the communication mode and a transmission parameter set are in a one-to-one correspondence, and the transmission parameter set includes the transmission parameter of the first channel and the transmission parameter of the second channel.

In some embodiments of the present invention, the transmission parameter of the first channel stored in the memory 804 includes at least one of the following information: a sequence used by the first channel, a time resource used for transmitting the first channel, a frequency resource used for transmitting the first channel, a mapping manner used by the first channel, a spatial coding matrix used by the first channel, a scrambling code used for scrambling information in the first channel, or information in the first channel; and/or the transmission parameter of the second channel includes at least one of the following information: a sequence used by the second channel, a time resource used for transmitting the second channel, a frequency resource used for transmitting the second channel, a mapping manner used by the second channel, a spatial coding matrix used by the second channel, a scrambling code used for scrambling information in the second channel, or information in the second channel.

In some embodiments of the present invention, the first channel stored in the memory 804 includes at least one of the following content: a synchronization channel, a reference signal, a broadcast channel, or a physical channel carrying system information; and; or the second channel includes at least one of the following content: a synchronization channel, a reference signal, a broadcast channel, or a physical channel carrying system information.

In some embodiments of the present invention, the processor 803 is specifically configured to perform the following step: when the first channel is a synchronization channel, determining that different communication modes are corresponding to different transmission parameters of the synchronization channel; or when the first channel is a reference signal, determining that different communication modes are corresponding to a same transmission parameter of a synchronization channel; or when the first channel is a broadcast channel, determining that different communication modes are corresponding to a same transmission parameter of a synchronization channel and/or a same transmission parameter of the reference signal; or when the first channel is a physical channel transmitted after a broadcast channel is transmitted, determining that different communication modes are corresponding to at least one of a same transmission parameter of a synchronization channel, a same transmission parameter of a reference signal, or a same transmission parameter of the broadcast channel.

In some embodiments of the present invention, the processor 803 is specifically configured to perform the following step:

determining the communication mode according to a transmission parameter interrelationship, where the transmission parameter interrelationship is an interrelationship between the transmission parameter of the first channel and the transmission parameter of the second channel.

In some embodiments of the present invention, the transmission parameter interrelationship stored in the memory 804 includes at least one of the following information: a time interval between a time resource used for transmitting the first channel and a time resource used for transmitting the second channel, a sequence used by the first channel and a sequence used by the second channel, a mapping manner used by the first channel and a mapping manner used by the second channel, or a resource used by the first channel and a resource used by the second channel.

In some embodiments of the present invention, the communication mode stored in the memory 804 includes at least one of the following modes: an in-band mode, a guardband mode, or a standalone mode.

It can be learned from the foregoing descriptions of the present invention with reference to this embodiment that, the terminal device determines the first channel transmitted by the base station, the UE obtains the transmission parameter of the first channel from the first channel, and the UE determines, according to the transmission parameter of the first channel, the communication mode used between the base station and the terminal device, where the communication mode and the transmission parameter of the first channel are in a one-to-one correspondence, so as to implement determining of the communication mode. In addition, after the terminal device determines the first channel sent by the base station to the terminal device, the UE can obtain the transmission parameter of the first channel from the first channel, and the terminal device can determine, according to the one-to-one correspondence between the communication mode and the transmission parameter of the first channel, the communication mode used by the base station. According to the channel transmission method provided in this embodiment of the present invention, determining a communication mode by terminal device and indicating the communication mode by a base station can be implemented. Therefore, the base station and the terminal device communicate with each other in the communication mode indicated by the base station. This improves flexibility of system design, reduces complexity of blindly detecting a communication mode by the terminal device, and reduces power consumption of the terminal device.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided in the present invention, connection relationships between modules indicate that the modules are in communication connections with each other, which may be specifically implemented as one or more communications buses or signal cables. Persons of ordinary skill in the art may understand and implement the embodiments of the present invention without creative efforts.

Based on the description of the foregoing implementations, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that are performed by a computer program can be easily implemented by using corresponding hardware. Moreover, a specific hardware structure used to implement a same function may be of various forms, for example, in a form of an analog circuit, a digital circuit, or a dedicated circuit. However, as for the present invention, software program implementation is a better implementation in most cases. Based on such an understanding, the technical solutions of the present invention essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present invention.

In conclusion, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present invention.

The invention claimed is:

1. A channel transmission method, comprising:
    receiving, by a terminal device, a physical broadcast channel (PBCH) from a network device;
    obtaining, by the terminal device, a transmission parameter set of the PBCH, wherein the transmission parameter set comprises carrier frequency resource used for transmitting the PBCH and information in the PBCH;
    determining, by the terminal device, a frame structure used between the network device and the terminal device according to relationship between the transmission parameter set of the PBCH and the frame structure; and
    communicating, by the terminal device, with the network device according to the frame structure.

2. The method according to claim 1, wherein the information in the PBCH comprises:
    information carried in the PBCH;
    a field carried in the PBCH; or
    an information element carried in the PBCH.

3. A non-transitory computer readable medium storing program codes which, when executed by one or more processors, cause the one or more processors to perform operations comprising:
    receiving a physical broadcast channel (PBCH) from a network device;
    obtaining a transmission parameter set of the PBCH, wherein the transmission parameter set comprises carrier frequency resource used for transmitting the PBCH and information in the PBCH;
    determining a frame structure used between the network device and a terminal device according to relationship between a transmission parameter set of the PBCH and the frame structure; and
    communicating with the network device according to the frame structure.

4. The non-transitory computer readable medium according to claim 3, wherein the information in the PBCH comprises:
    information carried in the PBCH;
    a field carried in the PBCH; or
    an information element carried in the PBCH.

5. A channel transmission method, comprising:
    determining, by a network device, a communications air interface technology to be used between the network device and a terminal device, wherein different communications air interface technologies correspond to different frame structures;
    determining, by the network device, a transmission parameter set of a physical broadcast channel (PBCH) according to relationship between the transmission parameter set of the PBCH and a frame structure, wherein the transmission parameter set of the PBCH indicates the frame structure to be used between the network device and the terminal device;
    transmitting, by the network device, the PBCH to the terminal device; and
    communicating, by the network device, with the terminal device by using the frame structure corresponding to the communications air interface technology.

6. The method according to claim 5, wherein the transmission parameter set comprises carrier frequency resource used for transmitting the PBCH and information in the PBCH.

7. The method according to claim 6, wherein the information in the PBCH comprises:
    information carried in the PBCH;
    a field carried in the PBCH; or
    an information element carried in the PBCH.

8. A non-transitory computer readable medium storing program codes which, when executed by one or more processors, cause the one or more processors to perform operations comprising:

determining communications air interface technology, wherein different communications air interface technologies correspond to different frame structures;

determining a transmission parameter set of a physical broadcast channel (PBCH) according to relationship between the transmission parameter set of the PBCH and a frame structure, wherein the transmission parameter set of the PBCH indicates the frame structure to be used between a network device and a terminal device;

transmitting the PBCH to the terminal device; and communicating with the terminal device by using the frame structure corresponding to the communications air interface technology.

9. The non-transitory computer readable medium according to claim 8, wherein information in the PBCH comprises:

information carried in the PBCH;

a field carried in the PBCH; or an information element carried in the PBCH.

10. A communication apparatus, comprising:

a receiver, the receiver configured to receive a physical broadcast channel (PBCH) from a network device;

at least one processor;

one or more memories coupled to the at least one processor and storing programming instructions for execution by the at least one processor to:

obtain a transmission parameter set of the PBCH, wherein the transmission parameter set comprises carrier frequency resource used for transmitting the PBCH and information in the PBCH; and determine a frame structure used between the network device and the communication apparatus according to relationship between the transmission parameter set of the PBCH and the frame structure; and a transmitter, the transmitter configured to communicate with the network device according to the frame structure.

11. The apparatus according to claim 10, wherein the information in the PBCH comprises:

information carried in the PBCH;

a field carried in the PBCH; or an information element carried in the PBCH.

12. A communication apparatus, comprising:

at least one processor;

one or more memories coupled to the at least one processor and storing programming instructions for execution by the at least one processor to:

determine a communications air interface technology to be used between the apparatus and a terminal device, wherein different communications air interface technologies correspond to different frame structures; and determine a transmission parameter set of a physical broadcast channel (PBCH) according to relationship between the transmission parameter set of the PBCH and a frame structure, wherein the transmission parameter set of the PBCH indicates the frame structure to be used between the apparatus and the terminal device; and a transmitter, the transmitter configured to:

transmit the PBCH to the terminal device; and communicate with the terminal device by using the frame structure corresponding to the communications air interface technology.

13. The apparatus according to claim 12, wherein the transmission parameter set comprises carrier frequency resource used for transmitting the PBCH and information in the PBCH.

14. The apparatus according to claim 13, wherein the information in the PBCH comprises:

information carried in the PBCH;

a field carried in the PBCH; or an information element carried in the PBCH.

* * * * *